(12) United States Patent
Si et al.

(10) Patent No.: US 11,812,517 B2
(45) Date of Patent: *Nov. 7, 2023

(54) METHOD AND APPARATUS FOR TIMING CONFIGURATION OF DISCOVERY SIGNAL AND CHANNEL

(71) Applicant: Samsung Electronics Co., Ltd., Suwon-si (KR)

(72) Inventors: Hongbo Si, Plano, TX (US); Yingzhe Li, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/303,271

(22) Filed: May 25, 2021

(65) Prior Publication Data
US 2021/0282228 A1    Sep. 9, 2021

Related U.S. Application Data

(63) Continuation of application No. 16/698,085, filed on Nov. 27, 2019, now Pat. No. 11,109,448.
(Continued)

(51) Int. Cl.
*H04W 88/06*    (2009.01)
*H04W 88/10*    (2009.01)
(Continued)

(52) U.S. Cl.
CPC .......... *H04W 88/06* (2013.01); *H04L 5/0051* (2013.01); *H04L 5/0094* (2013.01); *H04L 5/10* (2013.01);
(Continued)

(58) Field of Classification Search
CPC ... H04L 5/0051; H04L 5/0053; H04L 5/0094; H04L 5/10; H04L 5/0028; H04L 5/0023;
(Continued)

(56) References Cited

U.S. PATENT DOCUMENTS

2013/0022087 A1    1/2013  Chen et al.
2016/0262000 A1    9/2016  Koorapaty et al.
(Continued)

FOREIGN PATENT DOCUMENTS

CN    102082595 A    6/2011
CN    108632006 A    10/2018
(Continued)

OTHER PUBLICATIONS

Supplementary European Search Report dated Nov. 9, 2021, in connection with European Application No. 19896252.4, 13 pages.
(Continued)

*Primary Examiner* — Candal Elpenord

(57) ABSTRACT

A UE in a wireless communication system supporting a shared spectrum channel access is provided. The method comprises: determining a set of DSCH transmission windows based on a window periodicity, a window duration, and a window offset; determining a first set of SS/PBCH blocks within a DSCH transmission window of the set of DSCH transmission windows, wherein the first set of SS/PBCH blocks is QCLed; determining a second set of SS/PBCH blocks across at least two DSCH transmission windows being different DSCH windows of the set of DSCH transmission windows, wherein the second set of SS/PBCH blocks is QCLed; and receiving at least one SS/PBCH block that is located in the first set of SS/PBCH blocks or the second set of SS/PBCH blocks based on QCL information of the first set of SS/PBCH blocks or the second set of SS/PBCH blocks within the DSCH transmission window.

16 Claims, 12 Drawing Sheets

Related U.S. Application Data

(60) Provisional application No. 62/896,371, filed on Sep. 5, 2019, provisional application No. 62/892,701, filed on Aug. 28, 2019, provisional application No. 62/813,868, filed on Mar. 5, 2019, provisional application No. 62/801,842, filed on Feb. 6, 2019, provisional application No. 62/794,190, filed on Jan. 18, 2019, provisional application No. 62/778,065, filed on Dec. 11, 2018.

(51) Int. Cl.

| | | |
|---|---|---|
| *H04W 56/00* | (2009.01) | |
| *H04L 5/10* | (2006.01) | |
| *H04W 72/00* | (2023.01) | |
| *H04L 5/00* | (2006.01) | |
| *H04W 72/30* | (2023.01) | |

(52) U.S. Cl.
CPC ......... *H04W 56/001* (2013.01); *H04W 72/30* (2023.01); *H04W 88/10* (2013.01)

(58) Field of Classification Search
CPC ............. H04L 5/0007; H04L 27/26025; H04L 27/261; H04W 88/06; H04W 88/10; H04W 88/08; H04W 56/001; H04W 56/003; H04W 56/0045; H04W 56/0065; H04W 56/00; H04W 72/005; H04W 72/0446; H04B 17/373
USPC .................................................. 370/329–330
See application file for complete search history.

(56) References Cited

U.S. PATENT DOCUMENTS

| | | |
|---|---|---|
| 2017/0201898 A1 | 7/2017 | Park et al. |
| 2018/0192355 A1 | 7/2018 | Kim et al. |
| 2018/0248642 A1 | 8/2018 | Si et al. |
| 2018/0262313 A1 | 9/2018 | Nam et al. |
| 2019/0052379 A1 | 2/2019 | Lin et al. |
| 2019/0191457 A1 | 6/2019 | Si et al. |
| 2019/0306832 A1 | 10/2019 | Si et al. |
| 2019/0363809 A1 | 11/2019 | Yoon et al. |
| 2020/0021470 A1 | 1/2020 | Sun et al. |
| 2020/0053781 A1 | 2/2020 | Pan et al. |
| 2020/0154446 A1 | 5/2020 | Yerramalli et al. |
| 2020/0187159 A1 | 6/2020 | Ko et al. |
| 2020/0195358 A1 | 6/2020 | Yokomakura et al. |
| 2020/0280940 A1* | 9/2020 | Kim .................... H04W 56/001 |
| 2020/0296673 A1 | 9/2020 | Ouchi et al. |
| 2020/0366452 A1 | 11/2020 | Tang |
| 2020/0374725 A1 | 11/2020 | Chen et al. |
| 2021/0185694 A1* | 6/2021 | Hua .................... H04W 72/042 |
| 2021/0297968 A1* | 9/2021 | Alriksson ........... H04W 56/001 |

FOREIGN PATENT DOCUMENTS

| | | |
|---|---|---|
| KR | 10-2018-0108377 A | 10/2018 |
| WO | 2018203617 A1 | 11/2018 |
| WO | 2018204351 A1 | 11/2018 |
| WO | 2019124891 A1 | 6/2019 |
| WO | 2019190251 A1 | 10/2019 |

OTHER PUBLICATIONS

The First Office Action dated Sep. 24, 2021, in connection with Chinese Application No. 201980082638.5, 21 pages.
Charter Communications, "Feature lead summary #1 of initial access and mobility," R1-1811885, 3GPP TSG RAN WG1 Meeting RAN1#94BIS, Chengdu, P. R. China, Oct. 8-12, 2018, 10 pages.
Ericsson, "On initial access, RRM, mobility and RLM," R1-1813459, 3GPP TSG RAN WG1 Meeting #95, Spokane, USA, Nov. 12-16, 2018, 15 pages.
Spreadtrum Communications, "Discussion on initial access in NR-U," R1-1813078, 3GPP TSG RAN WG1 Meeting #95, Spokane, USA, Nov. 12-16, 2018, 7 pages.
Samsung, "Measurement based on SS block," R1-1713563, 3GPP TSG RAN WG1#90, Prague, Czech Republic, Aug. 21-25, 2017, 5 pages.
Samsung, "Initial Access and Mobility Procedure for NR-U," R1-1810861, 3GPP TSG RAN WG1 Meeting #94bis, Chengdu, China, Oct. 8-12, 2018, 8 pages.
Samsung, "Initial Access and Mobility Procedure for NR-U," R1-1812978, 3GPP TSG RAN WG1 Meeting #95, Spokane, USA, Nov. 12-16, 2018, 9 pages.
Xiaomi, "SSB transmission in NRU initial access," R1-1813363, 3GPP TSG RAN WG1 Meeting #95, Spokane, USA, Nov. 12-16, 2018, 3 pages.
"5G; NR; Physical channels and modulation (3GPP TS 38.211 version 15.3.0 Release 15)", ETSI TS 138 211 V15.3.0, Oct. 2018, 98 pages.
"5G; NR; Multiplexing and channel coding (3GPP TS 38.212 version 15.3.0 Release 15)", ETSI TS 138 212 V15.3.0, Oct. 2018, 102 pages.
"5G; NR; Physical layer procedures for control (3GPP TS 38.213 version 15.3.0 Release 15)", ETSI TS 138 213 V15.3.0, Oct. 2018 102 pages.
"5G; NR; Physical layer procedures for data (3GPP TS 38.214 version 15.3.0 Release 15)", ETSI TS 138 214 V15.3.0, Oct. 2018, 99 pages.
"5G; NR; Physical layer measurements (3GPP TS 38.215 version 15.3.0 Release 15)", ETSI TS 138 215 V15.3.0, Oct. 2018, 18 pages.
"5G; NR; Radio Resource Control (RRC); Protocol Specification (3GPP TS 38.331 version 15.3.0 Release 15)", ETSI TS 138 331 V15.3.0, Oct. 2018, 441 pages.
Huawei, HiSilicon, "Initial access in NR unlicensed", 3GPP TSG RAN WG1 Meeting #95, Nov. 12-16, 2018, R1-1812195, 10 pages.
"3rd Generation Partnership Project; Technical Specification Group Radio Access Network; Study on NR-based Access to Unlicensed Spectrum; (Release 16)", 3GPP TR 38.889 V1.0.0 (Nov. 2018), 120 pages.
International Search Report dated Mar. 24, 2020 in connection with International Patent Application No. PCT/KR2019/017449, 3 pages.
Written Opinion of the International Searching Authority dated Mar. 24, 2020 in connection with International Patent Application No. PCT/KR2019/017449, 4 pages.
Korean Intellectual Property Office, Office Action dated Dec. 30, 2022 regarding Application No. 10-2021-7012029, 7 pages.

* cited by examiner

METHOD AND APPARATUS FOR TIMING CONFIGURATION OF DISCOVERY SIGNAL AND CHANNEL

CROSS-REFERENCE TO RELATED APPLICATIONS AND CLAIM OF PRIORITY

This application is a continuation of U.S. patent application Ser. No. 16/698,085, filed on Nov. 27, 2019, which claims priority to: U.S. Provisional Patent Application No. 62/778,065, filed on Dec. 11, 2018; U.S. Provisional Patent Application No. 62/794,190, filed on Jan. 18, 2019; U.S. Provisional Patent Application No. 62/801,842, filed on Feb. 6, 2019; U.S. Provisional Patent Application No. 62/813,868, filed on Mar. 5, 2019; U.S. Provisional Patent Application No. 62/892,701, filed on Aug. 28, 2019; and U.S. Provisional Patent Application No. 62/896,371, filed on Sep. 5, 2019. The contents of the above-identified patent documents are incorporated herein by reference.

TECHNICAL FIELD

The present application relates generally to wireless communication systems, more specifically, the present disclosure relates to a DMRS sequence design of PBCH to carry more timing information for discovery signal and channel in a wireless communication system.

BACKGROUND

A communication system includes a downlink (DL) that conveys signals from transmission points such as base stations (BSs) or NodeBs to user equipments (UEs) and an uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB (eNB), referring to a NodeB in long-term evolution (LTE) communication system, and a gNodeB (gNB), referring to a NodeB in new radio (NR) communication system, may also be referred to as an access point or other equivalent terminology.

SUMMARY

The present disclosure relates to a pre-5G or 5G communication system to be provided for DMRS sequence of PBCH to carry more timing information for discovery signal and channel in an advanced communication system.

In one embodiment, a user equipment (UE) in a wireless communication system supporting a shared spectrum channel access is provided. The UE comprises at least one processor configured to: determine a set of discovery signal and channel (DSCH) transmission windows based on a window periodicity, a window duration, and a window offset; determine a first set of synchronization signals and physical broadcast channel (SS/PBCH) blocks within a DSCH transmission window of the set of DSCH transmission windows, wherein the first set of SS/PBCH blocks is quasi-co-located (QCLed); and determine a second set of SS/PBCH blocks across at least two DSCH transmission windows, the at least two DSCH transmission windows being different DSCH windows of the set of DSCH transmission windows, wherein the second set of SS/PBCH blocks is QCLed. The UE further comprises at least one transceiver operably connected to the at least one transceiver, the at least one transceiver configured to receive, from a base station (BS) over a downlink channel supporting the shared spectrum channel access, at least one SS/PBCH block that is located in the first set of SS/PBCH blocks or the second set of SS/PBCH blocks based on QCL information of the first set of SS/PBCH blocks or the second set of SS/PBCH blocks within the DSCH transmission window of the determined set of DSCH transmission windows.

In another embodiment, a base station (BS) in a wireless communication system supporting a shared spectrum channel access is provided. The BS comprises at least one transceiver configured to transmit, to a user equipment (UE) over a downlink channel supporting a shared spectrum channel access, at least one SS/PBCH block that is located in a first set of SS/PBCH blocks or a second set of SS/PBCH blocks within at least one discovery signal and channel (DSCH) transmission window of a set of DSCH transmission windows. The BS further comprises at least one processor operably connected to the at least one transceiver, the at least one processor configured to: determine the set of DSCH transmission windows based on a window periodicity, a window duration, and a window offset; determine the first set of SS/PBCH blocks within a DSCH transmission window of the set of DSCH transmission windows, wherein the first set of SS/PBCH blocks is quasi-co-located (QCLed); and determine the second set of SS/PBCH blocks across at least two DSCH transmission windows, the at least two DSCH transmission windows being different DSCH windows of the set of DSCH transmission windows, wherein the second set of SS/PBCH blocks is QCLed.

In yet another embodiment, a method of a user equipment (UE) in a wireless communication system supporting a shared spectrum channel access is provided. The method comprises: determining a set of discovery signal and channel (DSCH) transmission windows based on a window periodicity, a window duration, and a window offset; determining a first set of synchronization signals and physical broadcast channel (SS/PBCH) blocks within a DSCH transmission window of the set of DSCH transmission windows, wherein the first set of SS/PBCH blocks is quasi-co-located (QCLed); determining a second set of SS/PBCH blocks across at least two DSCH transmission windows, the at least two DSCH transmission windows being different DSCH windows of the set of DSCH transmission windows, wherein the second set of SS/PBCH blocks is QCLed; and receiving, from a base station (BS) over a downlink channel supporting the shared spectrum channel access, at least one SS/PBCH block that is located in the first set of SS/PBCH blocks or the second set of SS/PBCH blocks based on QCL information of the first set of SS/PBCH blocks or the second set of SS/PBCH blocks within the DSCH transmission window of the determined set of DSCH transmission windows.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.3.0, "NR; Physical channels and modulation;" 3GPP TS 38.212 v15.3.0, "NR; Multiplexing and Channel coding;" 3GPP TS 38.213 v15.3.0, "NR; Physical Layer Procedures for Control;" 3GPP TS 38.214 v15.3.0, "NR; Physical Layer Procedures for Data;" 3GPP TS 38.215 v15.3.0, "NR; Physical Layer Measurements;" 3GPP TS 38.321 v15.2.0, "NR; Medium Access Control (MAC) protocol specification;" and 3GPP TS 38.331 v15.3.0, "NR; Radio Resource Control (RRC) Protocol Specification."

Figure 1:
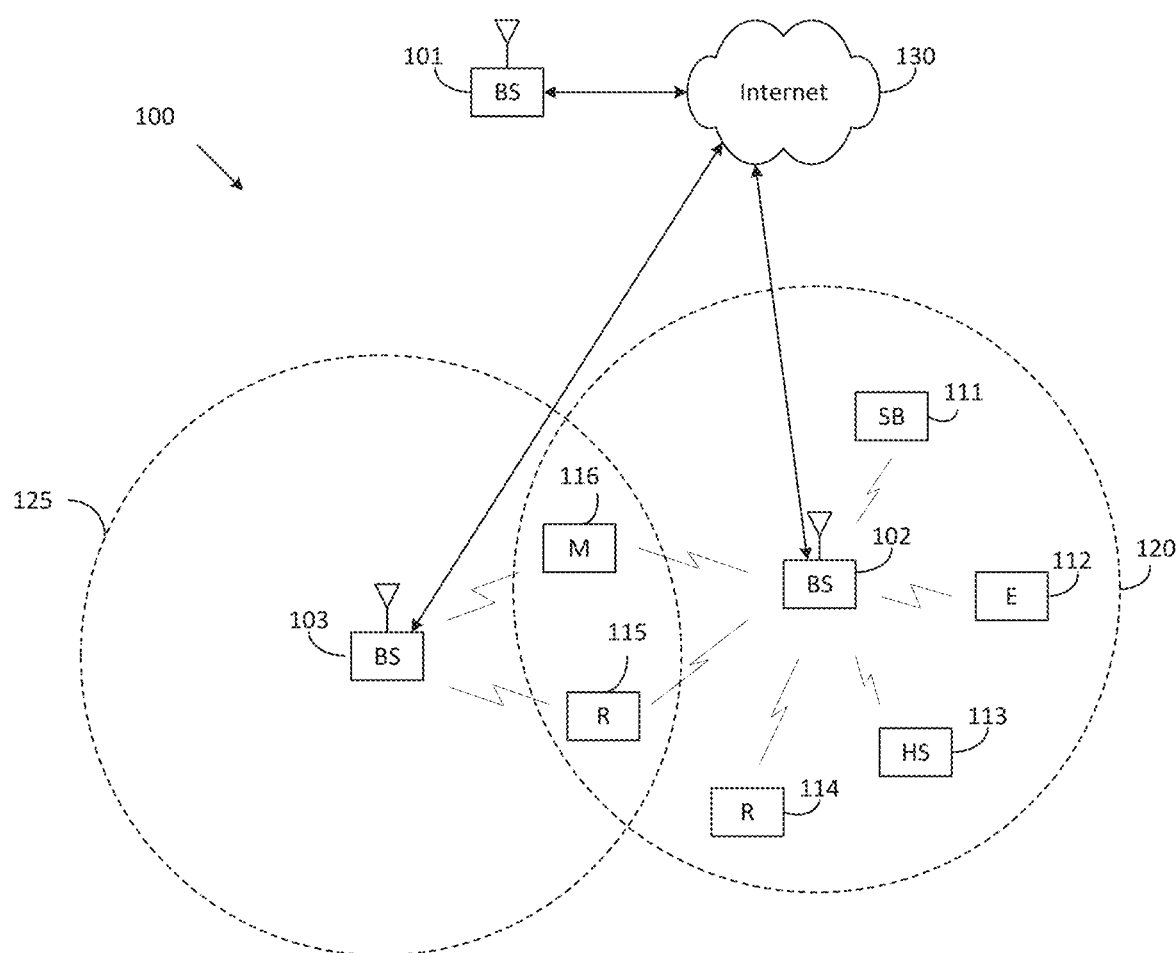
FIG. 1 illustrates an example wireless network according to embodiments of the present disclosure.
Figure 2:
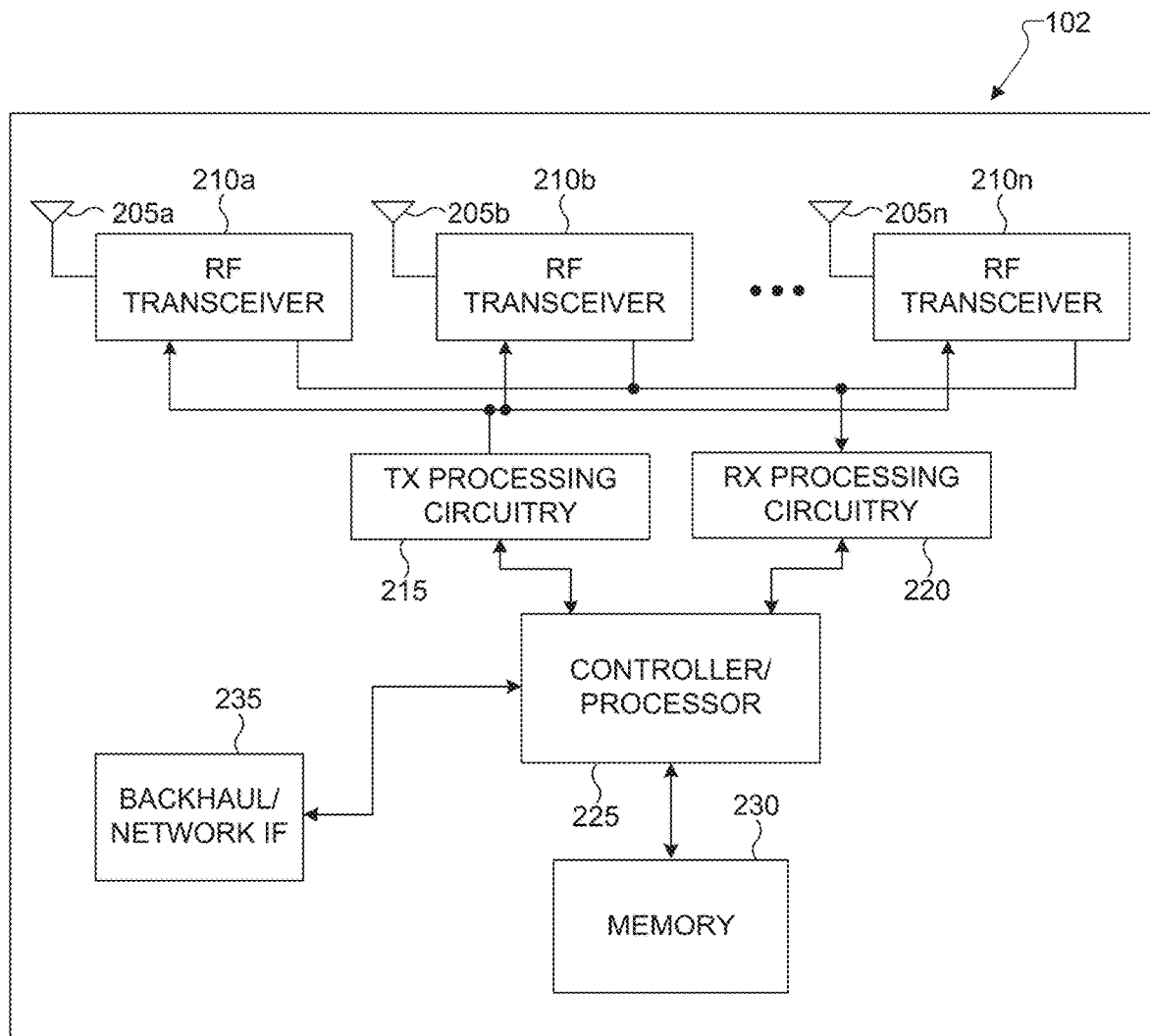
FIG. 2 illustrates an example gNB according to embodiments of the present disclosure.
Figure 3:
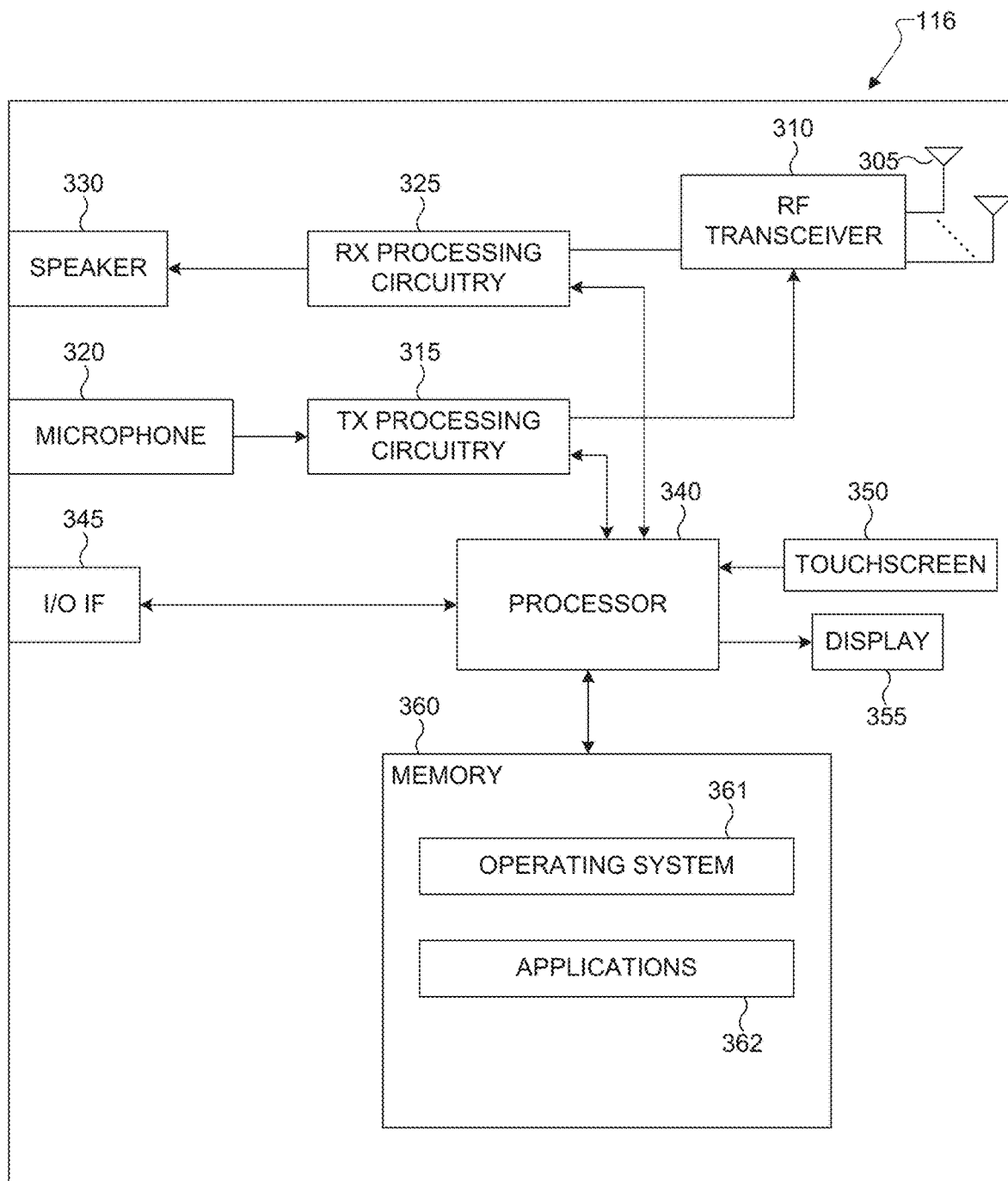
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for reception reliability for data and control information in an advanced wireless communication system. In certain embodiments, and one or more of the gNBs 101-103 includes circuitry, programing, or a combination thereof, for efficient timing configuration of discovery signal and channel in an advanced wireless communication system.

Although FIG. 1 illustrates one example of a wireless network, various changes may be made to FIG. 1. For example, the wireless network could include any number of gNBs and any number of UEs in any suitable arrangement.

Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to reducing power consumption for a user equipment (UE) communicating with a base station and to transmissions to and receptions from a UE of physical downlink control channels (PDCCHs) for operation with dual connectivity. A communication system includes a downlink (DL) that refers to transmissions from a base station or one or more transmission points to UEs and an uplink (UL) that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can include 14 symbols, have duration of 1 millisecond or 0.5 milliseconds, and an RB can have a BW of 180 kHz or 360 kHz and include 12 SCs with inter-SC spacing of 15 kHz or 30 kHz, respectively.

DL signals include data signals conveying information content, control signals conveying DL control information (DCI) formats, and reference signals (RS) that are also known as pilot signals. A gNB can transmit data information (e.g., transport blocks) or DCI formats through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information (e.g., transport blocks) or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

DL transmissions and UL transmissions can be based on an orthogonal frequency division multiplexing (OFDM) waveform including a variant using DFT precoding that is known as DFT-spread-OFDM.

Figure 4:
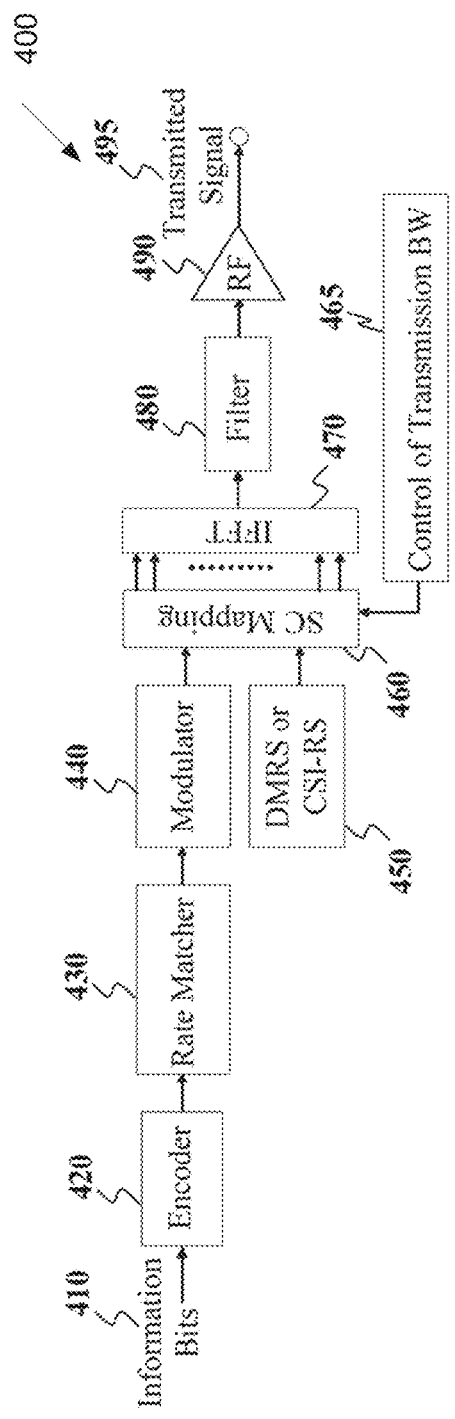
FIG. 4 illustrates an example transmitter structure using OFDM according to embodiments of the present disclosure.

FIG. 4 illustrates an example transmitter structure 400 using OFDM according to embodiments of the present disclosure. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/frequency resources by rate matcher 430 and modulated by modulator 440. Subsequently, modulated encoded symbols and DMRS or CSI-RS 450 are mapped to SCs 460 by SC mapping unit 465, an inverse fast Fourier transform (IFFT) is performed by filter 470, a cyclic prefix (CP) is added by CP insertion unit 480, and a resulting signal is filtered by filter 490 and transmitted by an radio frequency (RF) unit 495.

Figure 5:
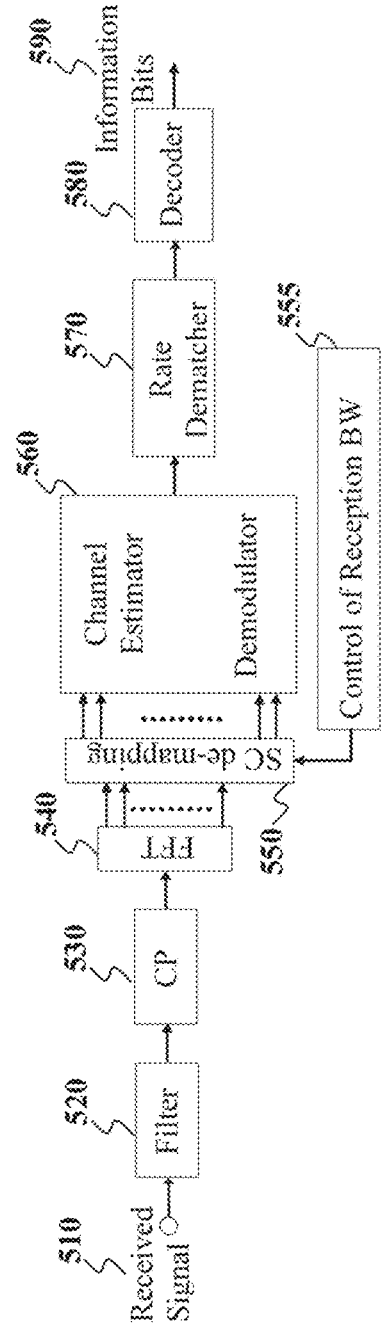
FIG. 5 illustrates an example receiver structure using OFDM according to embodiments of the present disclosure.

FIG. 5 illustrates an example receiver structure 500 using OFDM according to embodiments of the present disclosure. An embodiment of the receiver structure 500 shown in FIG. 5 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal unit removes a CP 530, a filter 540 applies a fast Fourier transform (FFT), SCs de-mapping unit 550 de-maps SCs selected by BW selector unit 555, received symbols are demodulated by a channel estimator and a demodulator unit 560, a rate de-matcher 570 restores a rate matching, and a decoder 580 decodes the resulting bits to provide information bits 590.

A UE typically monitors multiple candidate locations for respective potential PDCCH transmissions to decode multiple candidate DCI formats in a slot. Monitoring a PDCCH candidates means receiving and decoding the PDCCH candidate according to DCI formats the UE is configured to receive. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE prior to a UE establishing a radio resource control (RRC) connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher-layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission can be in control channel elements (CCEs) that are included in a control resource set. A UE determines CCEs for a PDCCH reception based on a search space such as a UE-specific search space (USS) for PDCCH candidates with DCI format having CRC scrambled by a RNTI, such as a C-RNTI, that is configured to the UE by UE-specific RRC signaling for scheduling PDSCH reception or PUSCH transmission, and a common search space (CSS) for PDCCH candidates with DCI formats having CRC scrambled by other RNTIs. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

Figure 6:
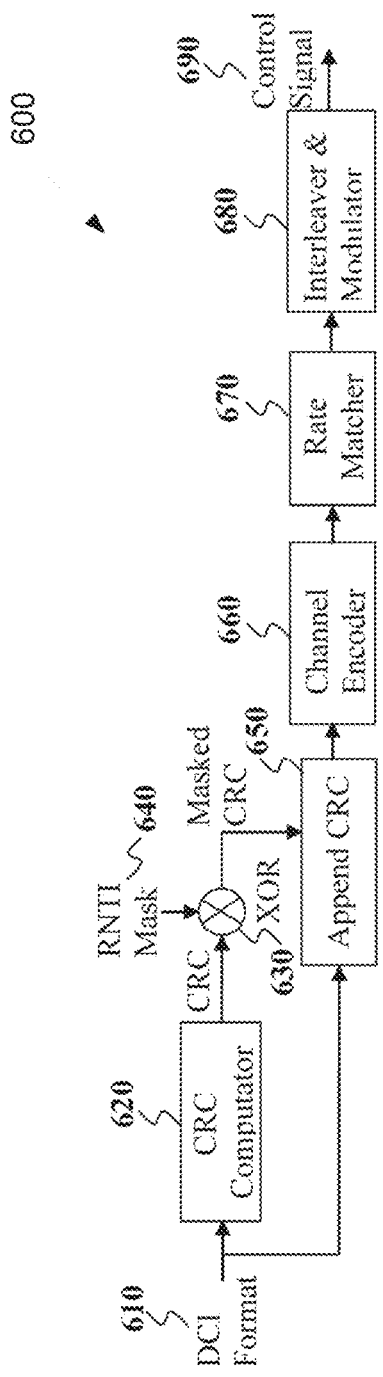
FIG. 6 illustrates an example encoding process for a DCI format according to embodiments of the present disclosure.

FIG. 6 illustrates an example encoding process 600 for a DCI format according to embodiments of the present disclosure. An embodiment of the encoding process 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 610 is determined using a CRC computation unit 620, and the CRC is masked using an exclusive OR (XOR) operation unit 630 between CRC bits and RNTI bits 640. The XOR operation is defined as XOR(0,0)=0, XOR(0,1)=1, XOR(1,0)=1, XOR(1,1)=0. The masked CRC bits are appended to DCI format information bits using a CRC append unit 650. An encoder 660 performs channel coding (such as tail-biting convolutional coding or polar coding), followed by rate matching to allocated resources by rate matcher 670. Interleaving and modulation units 680 apply interleaving and modulation, such as QPSK, and the output control signal 690 is transmitted.

Figure 7:
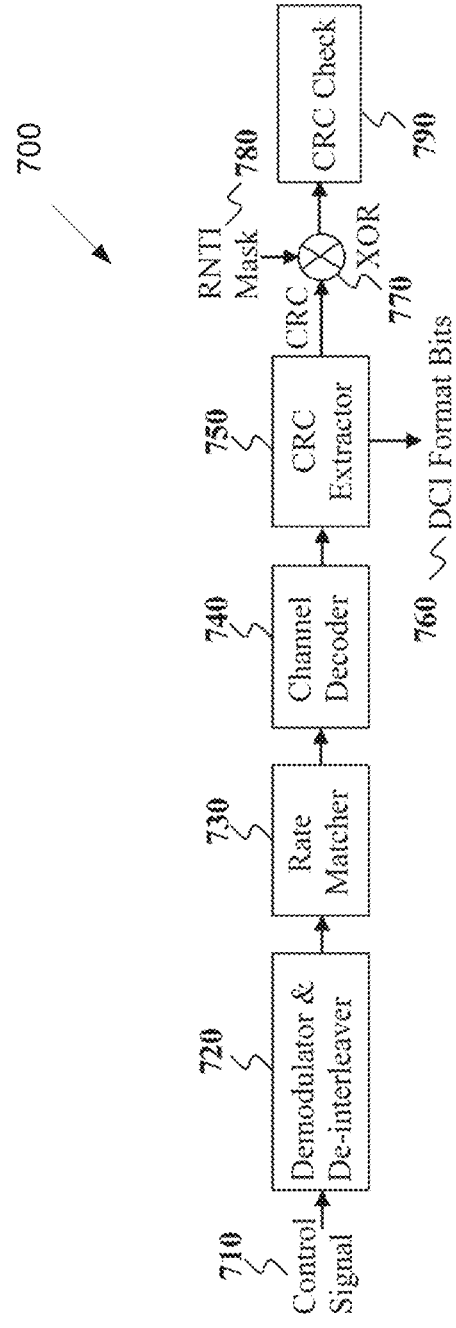
FIG. 7 illustrates an example decoding process for a DCI format for use with a UE according to embodiments of the present disclosure.

FIG. 7 illustrates an example decoding process 700 for a DCI format for use with a UE according to embodiments of the present disclosure. An embodiment of the decoding process 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with an RNTI 780 (when applicable) and a CRC check is performed by unit 790. When the CRC check succeeds (check-sum is zero), the DCI format information bits are considered to be valid. When the CRC check does not succeed, the DCI format information bits are considered to be invalid.

For an LTE initial access, primary and secondary synchronization signals (PSS and SSS, respectively) are used for coarse timing and frequency synchronization and cell identification (ID) acquisition. Since PSS/SSS is transmitted twice per 10 ms radio frame and time-domain enumeration is introduced in terms of system frame number (SFN), frame timing is detected from PSS/SSS to avoid the need for increasing the detection burden from physical broadcast channel (PBCH). In addition, cyclic prefix (CP) length and, if unknown, duplexing scheme can be detected from PSS/SSS. The PSS is constructed from a frequency-domain ZC sequence of length 63, with the middle element truncated to avoid using the d.c. subcarrier. Three roots are selected for PSS to represent the three physical layer identities within each group of cells.

The SSS sequences are based on the maximum length sequences (also known as M-sequences). Each SSS sequence is constructed by interleaving two length-31 BPSK modulated sequences in frequency domain, where the two source sequences before modulation are different cyclic shifts of the same M-sequence. The cyclic shift indices are constructed from the physical cell ID group.

Since PSS/SSS detection can be faulty (due to, for instance, non-idealities in the auto- and cross-correlation properties of PSS/SSS and lack of CRC protection), cell ID hypotheses detected from PSS/SSS may occasionally be confirmed via PBCH detection. PBCH is primarily used to signal the master block information (MIB) which consists of DL and UL system bandwidth information (3 bits), PHICH information (3 bits), and SFN (8 bits). Adding 10 reserved bits (for other uses such as MTC), the MIB payload amounts to 24 bits. After appended with a 16-bit CRC, a rate-1/3 tail-biting convolutional coding, 4× repetition, and QPSK modulation are applied to the 40-bit codeword. The resulting QPSK symbol stream is transmitted across 4 subframes spread over 4 radio frames. Other than detecting MIB, blind detection of the number of CRS ports is also needed for PBCH.

For NR licensed spectrum, each synchronization and PBCH signal block (SS/PBCH block) compromises of one symbol for PSS, two symbols for PBCH, one symbol for SSS and PBCH, where the four symbols are mapped consecutively, and time division multiplexed. SS is a unified design, including the PSS and SSS sequence design, for all supported carrier frequency rages in NR. The transmission bandwidth of PSS and SSS (e.g., 12 RBs) is smaller than the transmission bandwidth of the whole SS/PBCH block (e.g., 20 RBs). For initial cell selection for NR cell, a UE assumes the default SS burst set periodicity as 20 ms, and for detecting a non-standalone NR cell, a network provides one SS burst set periodicity information per frequency carrier to a UE and information to derive measurement timing/duration if possible.

Other than the MIB, the remaining minimum system information (RMSI) is carried by physical downlink shared channel (PDSCH) with scheduling info carried by the corresponding physical downlink control channel (PDCCH). Similar structure applies to other system information (OSI) and paging message. The control resource set (CORESET) for receiving common control channels, such as RMSI, is configured in content of PBCH.

The federal communications commission (FCC) defined unlicensed carriers to provide cost-free public access spectrum. Use of unlicensed carriers by a UE is allowed only under the provisions that the UE does not generate noticeable interference to communications in licensed carriers and that communications in unlicensed carriers are not protected from interference. For example, unlicensed carriers include the industrial, scientific and medical carriers and the Unlicensed National Information Infrastructure carriers that can be used by IEEE 802.11 devices. It may be possible to deploy LTE radio access technology (RAT) on an unlicensed frequency spectrum, which is also known as LTE-unlicensed or LTE-U or licensed assisted access (LAA).

Figure 8:
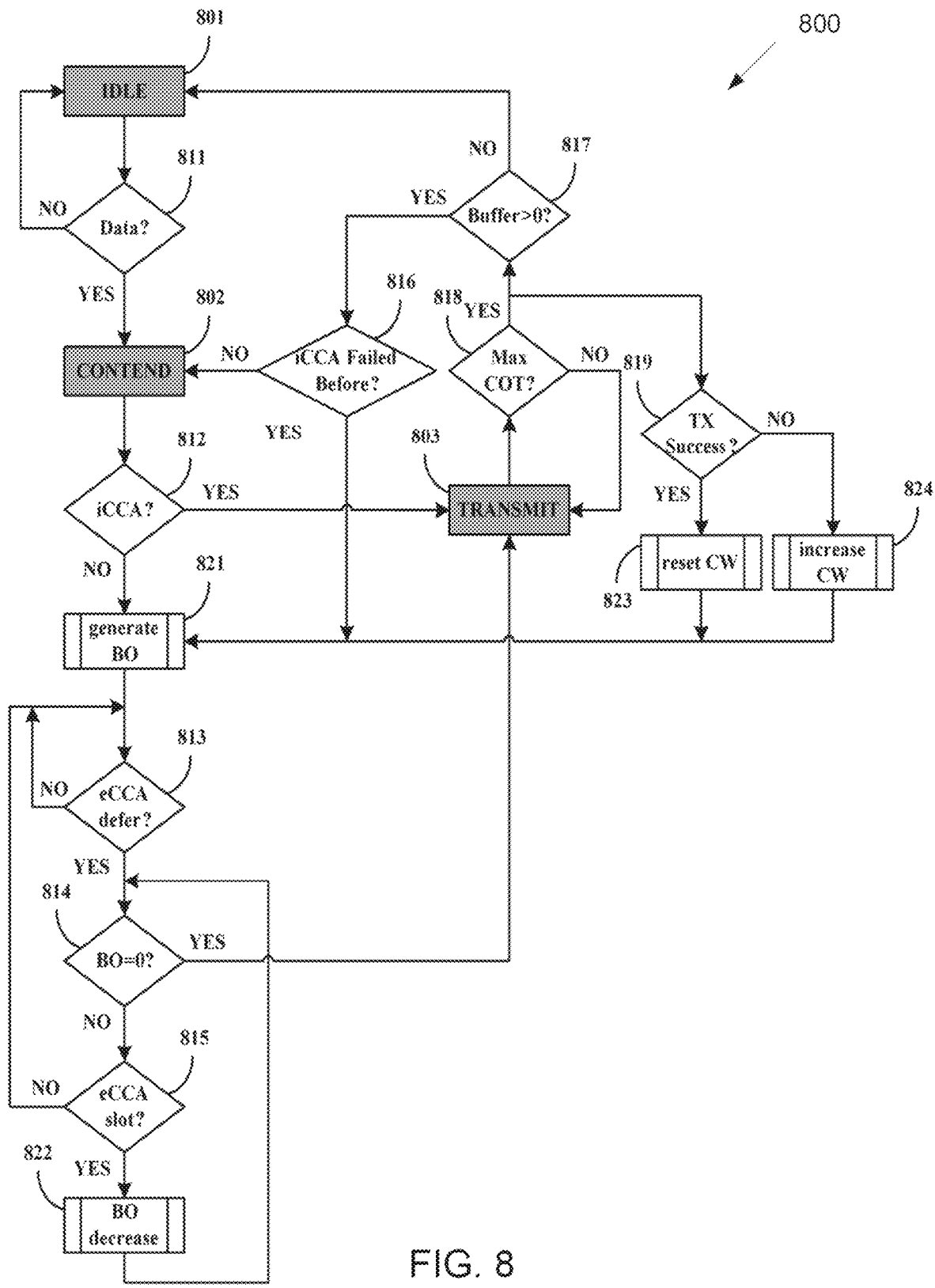
FIG. 8 illustrates an example flowchart for listen-before-talk based channel access procedure in LAA according to embodiments of the present disclosure.

FIG. 8 illustrates an example flowchart for listen-before-talk 800 based channel access procedure in LAA according to embodiments of the present disclosure. An embodiment of the listen-before-talk 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

In LTE system, an eNB may transmit a transmission including a physical downlink shared channel (PDSCH), or a physical downlink control channel (PDCCH), or an enhanced physical downlink control channel (EPDCCH) a carrier on which LAA Scell(s) transmission(s) are performed, after sensing the channel to be idle during the slot durations of a defer duration (812); and after the backoff counter (BO) is zero (814) in step 4). An example of this channel access procedure it illustrated in FIG. 8 (e.g., it is also referred to as Cat4 LBT for this type of channel access procedure).

The backoff counter is adjusted by sensing the channel for additional slot duration(s) according to the steps below: (1) set the counter as a random number (821) uniformly distributed between 0 and contention window (CW) value, and go to step (4); (2) if the counter is greater than 0, and the eNB chooses to decrement the counter, decrease the counter by 1 (822); (3) sense the channel for an additional slot duration, and if the additional slot duration is idle, go to step (4); else, go to step (5); (4) if the counter is 0, stop; else, go to step (2); (5) sense the channel until either a busy slot is detected within an additional defer duration or all the slots of the additional defer duration are detected to be idle; and (6) if the channel is sensed to be idle during all the slot durations of the additional defer duration, go to step (4); else, go to step (5).

Moreover, the eNB maintains the contention window value and adjusts it before setting a backoff counter, for each of the supported channel access priority class. The adjustment of the contention window value is based on the HARQ-ACK/NACK values corresponding to PDSCH transmission(s) in a reference subframe, wherein the reference subframe is the starting of the most recent transmission on the carrier made by the eNB, for which at least some HARQ-ACK/NACK feedback is expected to be available.

Also, in LTE system, an eNB may transmit a transmission including discovery signal but not including PDSCH on a carrier on which LAA Scell(s) transmission(s) are performed immediately after sensing the channel to be idle for at least a sensing interval of 25 us and if the duration of the transmission is less than 1 ms. It's also referred to as Cat2 LBT for this type of channel access procedure.

The present disclosure focuses on the design of timing information delivered by the discovery signal and channel (DSCH) on NR unlicensed spectrum (note that in the present disclosure, unlicensed spectrum also includes shared spectrum). In the present disclosure, the DSCH contains at least a set of SS/PBCH block(s), and further contains at least one of a configurable CORESET(s) and PDSCH(s) of RMSI, OSI, or paging, or a channel state indicator reference signal (CSI-RS) if configured, which can be considered as enhancement to discovery signals in LTE for initial cell acquisition purpose as well. The terminology of DSCH can also be referred to other equivalent terminologies, such as discovery reference signal and channel, discovery block, discovery burst, discovery burst set, discovery reference signal (DRS), and etc.

Figure 9:
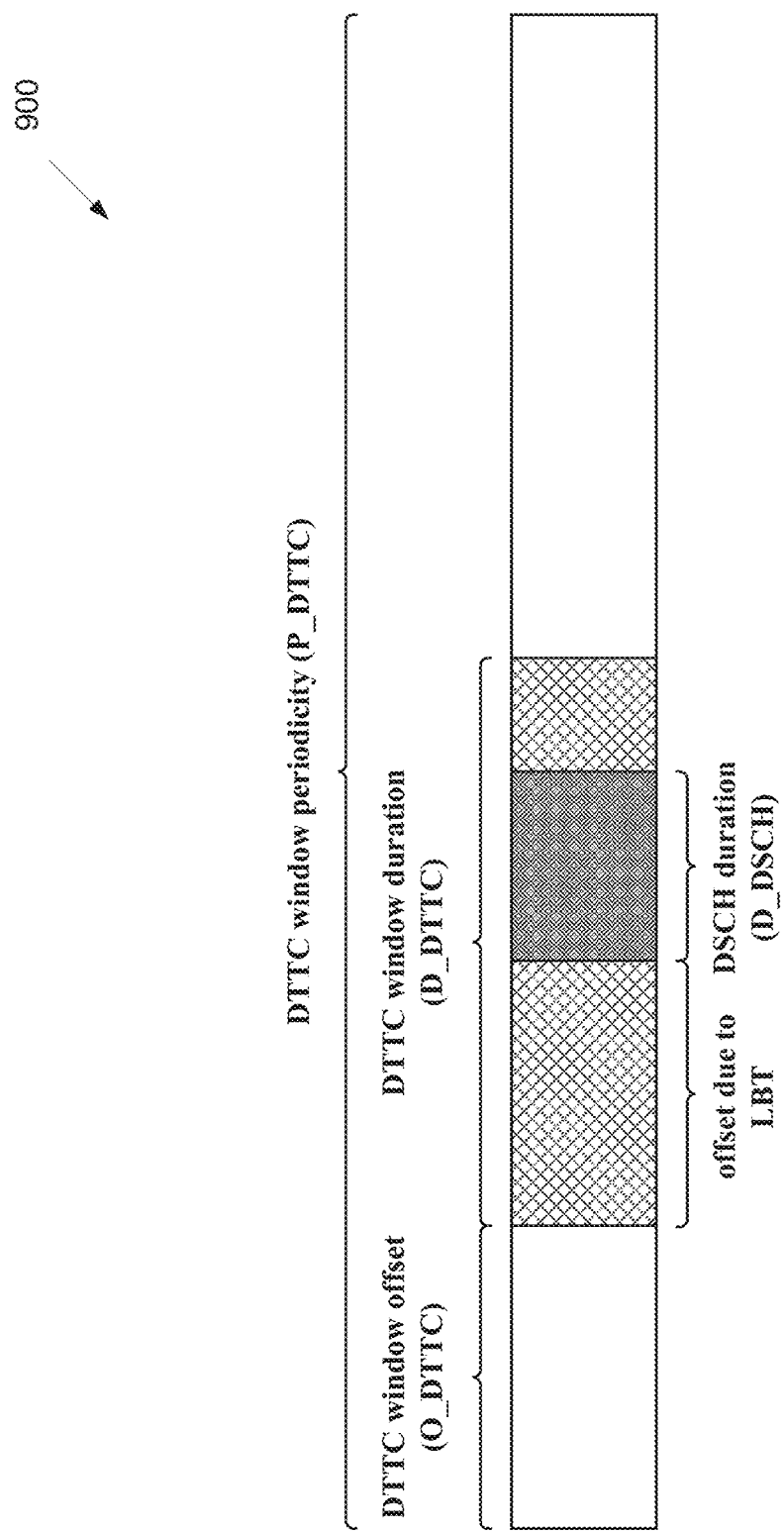
FIG. 9 illustrates an example DSCH transmission timing configuration according to embodiments of the present disclosure.

FIG. 9 illustrates an example DSCH transmission timing configuration 900 according to embodiments of the present disclosure. An embodiment of the DSCH transmission timing configuration 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

In one embodiment, the timing configuration for DSCH transmission window is denoted as DTTC in the present disclosure, wherein a DTTC contains configuration of at least one of a window periodicity (e.g., P_DTTC), a window duration (e.g., D_DTTC), or a window offset within the periodicity (e.g., O_DTTC). In one example, a gNB may transmit the DSCH within the DTTC window, subject to LBT, and a UE expects to receive DSCH (e.g., with a duration of D_DSCH) within the DTTC window, based on the DTTC. An illustration of this embodiment is shown in FIG. 9.

In one example, the DTTC window periodicity is configurable and the candidate configurable values are the same as the periodicity for SS/PBCH blocks included in the DTTC window, e.g., one value from the set {5, 10, 20, 40, 80, 160} ms. For one example, the DTTC window periodicity can be the same as the periodicity of SS/PBCH block, and no extra explicit configuration is needed (e.g., a UE assumes the DTTC window periodicity is configured by the high layer parameter ssb-PeriodicityServingCell in RMSI). For this example, a UE assumes all SS/PBCH blocks are transmitted in a DTTC window, and no SS/PBCH block is transmitted outside DTTC window.

In another example, the DTTC window periodicity is configurable and the candidate configurable value is at least 20 ms, e.g., taking a value from the set {20, 40, 80, 160} ms. For one example, the DTTC window periodicity can be the same as the periodicity of SS/PBCH block, and no extra explicit configuration is needed (e.g., a UE assumes the DTTC window periodicity is configured by the high layer parameter ssb-PeriodicityServingCell in RMSI). For this example, a UE assumes all SS/PBCH blocks are transmitted in a DTTC window, and no SS/PBCH block is transmitted outside DTTC window.

In yet another example, the configuration of the DTTC window periodicity is same as the configured periodicity of SS/PBCH blocks (e.g., using the same high layer parameter ssb-PeriodicityServingCell in RMSI and no new configuration field is required), and a UE assumes all SS/PBCH blocks are transmitted in a DTTC window and no SS/PBCH block is transmitted outside DTTC window.

In yet another example, the configuration of the DTTC window periodicity is separately configured from the configured periodicity of SS/PBCH blocks (e.g., a new configuration field is required). There may be SS/PBCH blocks transmitted outside the DTTC, based on the configurations of DTTC and periodicity of SS/PBCH blocks. In one example, the configuration of the DTTC window periodicity is indicated in the system information, e.g., RMSI.

In yet another example, one of the DTTC is predefined and assumed by the UE for initial access purpose, e.g., 20 ms window periodicity with a predefined window offset as 0 ms and a predefined window duration as 5 ms.

In yet another example, if the DTTC window periodicity in a DTTC is configured as P_DTTC ms, and the transmission duration of DSCH within a window is determined as at most D_DSCH ms, one-shot LBT (e.g., Cat2 LBT) can be utilized for the transmission of DSCH when a combination of P_DTTC and D_DSCH satisfies a predefined condition. For example, the ratio of D_DSCH and P_DSCH is smaller than or equal to a predefined threshold (e.g., 5%).

TABLE 1 or a subset of TABLE 1 can be an example combination of DTTC periodicity and DSCH duration to utilize Cat2 LBT, for the predefined threshold as 5%.

TABLE 1

Example of combination of DTTC periodicity and DSCH duration to utilize Cat2 LBT.

| No. | P_DTTC | D_DSCH | Example of DSCH duration |
|---|---|---|---|
| 1 | 5 | 0.25 | 1 slot with 60 kHz SCS |
| 2 | 10 | 0.25 | 1 slot with 60 kHz SCS |
| 3 | 10 | 0.5 | 2 slots with 60 kHz SCS or 1 slot with 30 kHz SCS |
| 4 | 20 | 0.25 | 1 slot with 60 kHz SCS |
| 5 | 20 | 0.5 | 2 slots with 60 kHz SCS or 1 slot with 30 kHz SCS |
| 6 | 20 | 1 | 4 slots with 60 kHz SCS or 2 slots with 30 kHz SCS or 1 slot with 15 kHz |
| 7 | 40 | 0.25 | 1 slot with 60 kHz SCS |
| 8 | 40 | 0.5 | 2 slots with 60 kHz SCS or 1 slot with 30 kHz SCS |
| 9 | 40 | 1 | 4 slots with 60 kHz SCS or 2 slots with 30 kHz SCS or 1 slot with 15 kHz |
| 10 | 80 | 0.25 | 1 slot with 60 kHz SCS |
| 11 | 80 | 0.5 | 2 slots with 60 kHz SCS or 1 slot with 30 kHz SCS |
| 12 | 80 | 1 | 4 slots with 60 kHz SCS or 2 slots with 30 kHz SCS or 1 slot with 15 kHz |
| 13 | 160 | 0.25 | 1 slot with 60 kHz SCS |
| 14 | 160 | 0.5 | 2 slots with 60 kHz SCS or 1 slot with 30 kHz SCS |
| 15 | 160 | 1 | 4 slots with 60 kHz SCS or 2 slots with 30 kHz SCS or 1 slot with 15 kHz |

In yet another example, the window duration in a DTTC can be not exceeding the measurement gap for that particular frequency layer, e.g., 6 ms.

In yet another example, the maximum window duration in a DTTC is fixed in time for all SCS supported and for both standalone and non-standalone operations, e.g., the fixed maximum window duration can be a half frame. In this approach, the number of potential SS/PBCH block locations within a DTTC window is scalable based on the SCS of SS/PBCH blocks in the DTTC window. For instance, if the maximum window duration is fixed as D_DTTC, which corresponds to X1 potential SS/PBCH block locations with the SCS of SS/PBCH block as SCS_SSB1, the number of potential SS/PBCH block locations within the DTTC widow can be X2=X1/(SCS_SSB2/SCS_SSB1) for the SCS of SS/PBCH block as SCS_SSB2. An illustration of this approach is given by FIG. 10.

Figure 10:
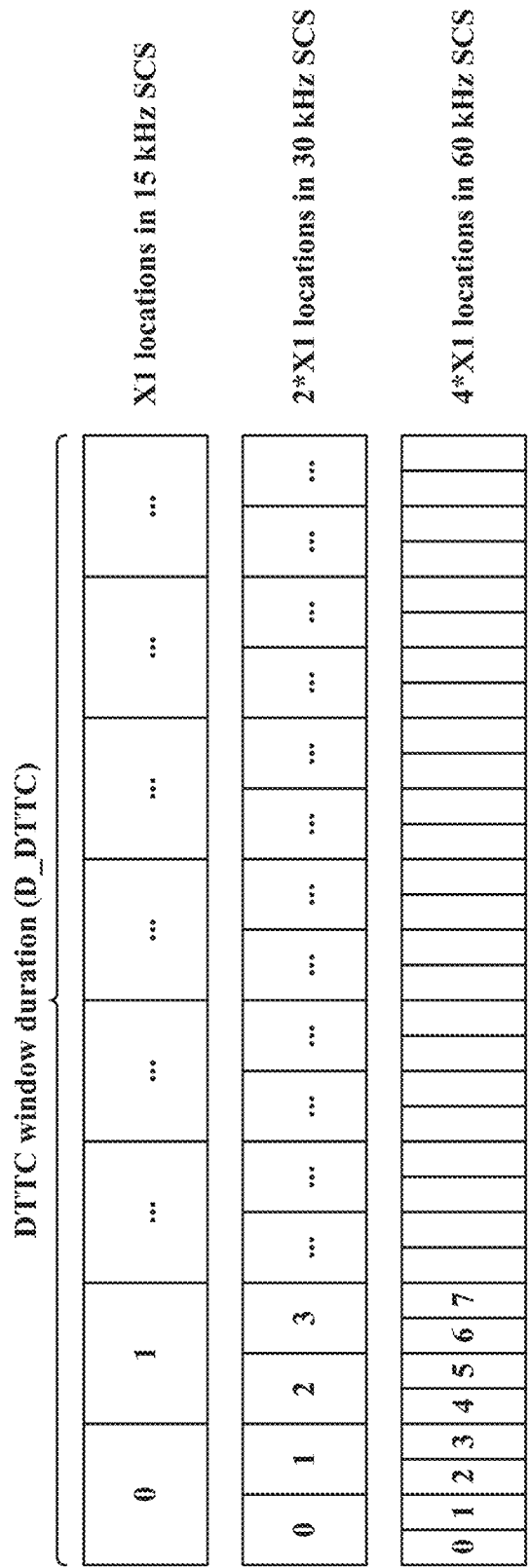
FIG. 10 illustrates an example maximum DTTC window duration with scalable number of potential SSPBSH block according to embodiments of the present disclosure.

FIG. 10 illustrates an example maximum DTTC window duration 1000 with scalable number of potential SS/PBSH block according to embodiments of the present disclosure. An embodiment of the maximum DTTC window duration 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

In yet another example, the maximum window duration is scalable based on the SCS of SS/PBCH blocks in the DTTC window. For example, the maximum window duration is fixed for a first SCS (e.g., due to single default SCS of SS/PBCH blocks for standalone operation), and scalable based on the configured second SCS of SS/PBCH blocks, such that the number of potential SS/PBCH block locations within a DTTC window is the same. For instance, if the maximum window duration is fixed as D_1 for a first SCS, the maximum window duration can be D_1/(SCS_2/SCS_1) for a second SCS, wherein SCS_1 is the predefined SCS of SS/PBCH block in the unit of kHz (e.g., for standalone operation), and SCS_1 is the configured second SCS of SS/PBCH block in the unit of kHz (e.g., for non-standalone operation). An illustration of this approach is shown in FIG. 11 (e.g., one of 15 kHz, 30 kHz, and 60 kHz can be SCS_1).

Figure 11:
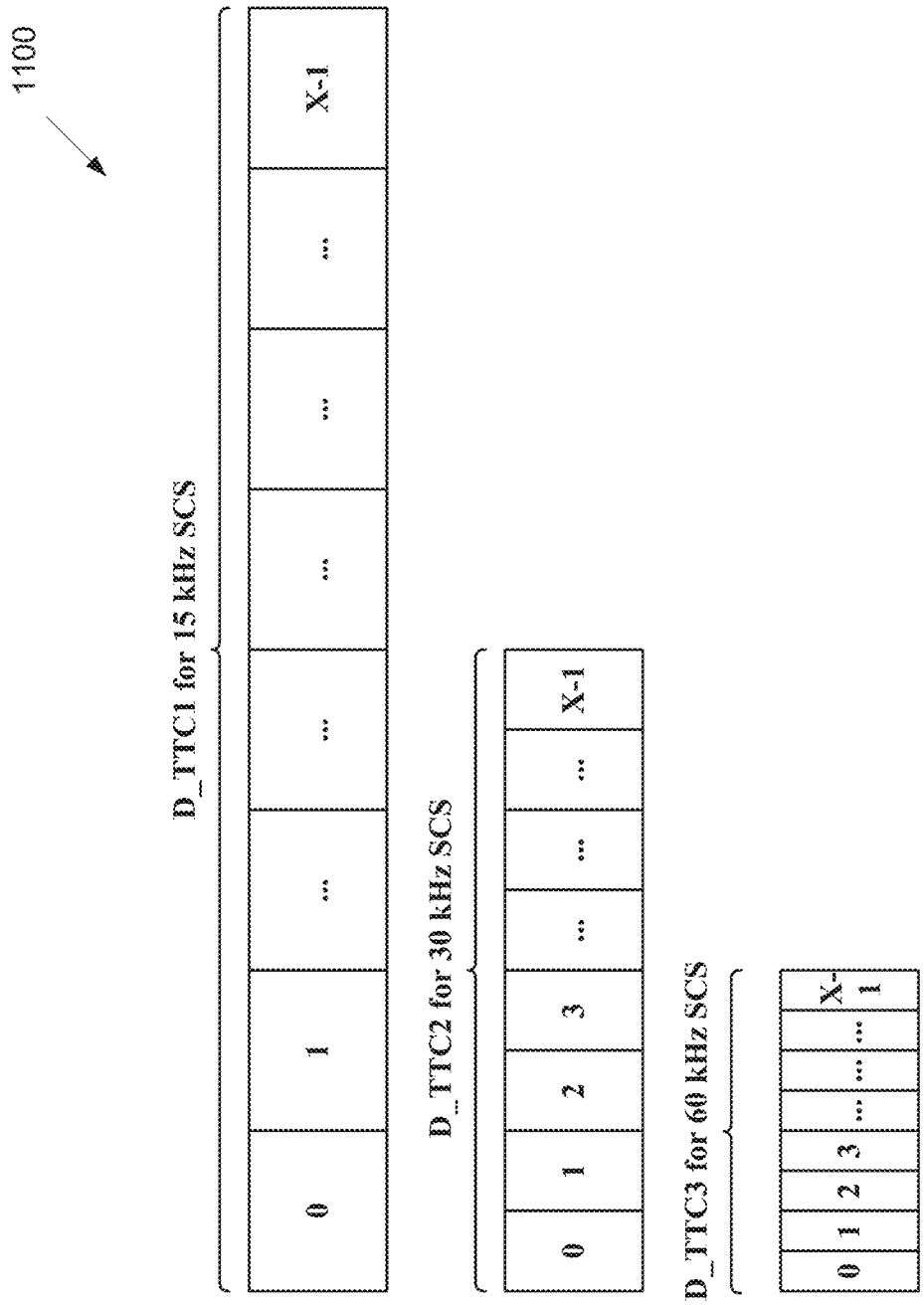
FIG. 11 illustrates an example fixed number of potential SS/PBCH block locations with scalable DTTC window duration according to embodiments of the present disclosure.

FIG. 11 illustrates an example fixed number of potential SS/PBCH block locations 1100 with scalable DTTC window duration according to embodiments of the present disclosure. An embodiment of the fixed number of potential SS/PBCH block locations 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

In yet another example, the DTTC window offset within a configured periodicity is fixed as 0. For example, if the DTTC window periodicity is always an integer multiple of half frame (e.g., 5 ms), the DTTC window can be assumed to start from half frame boundary.

In yet another example, the DTTC window offset within a configured periodicity is indicated by the half frame indicator in PBCH content, such that the offset is always in multiple of 5 ms.

In yet another example, the DTTC window offset within a configured periodicity can be configurable, e.g., from 0 ms to 5-D_DTTC ms in the granularity of 1 ms or 1 slot, wherein D_DTTC is the DTTC window duration.

In yet another example, the DTTC window duration can be fixed as the maximum DTTC window duration. In this approach, there is only one DTTC window duration assumed by the UE.

In yet another example, the DTTC window duration can be configurable. For one aspect, when the DTTC window duration can be configurable, the configuration can be indicated in the system information (e.g., RMSI or equivalently SIB1). For one example of the configuration, it can be a cell-specific configuration of the serving cell and indicated in higher layer parameter ServingCellConfigCommonSIB. For one example, the candidate configurable values for the DTTC window duration can be smaller than or equal to the maximum DTTC window duration, with a step size of 1 ms (e.g., the candidate configurable values can be {1, 2, 3, 4, 5} ms if the maximum DTTC window duration is 5 ms). For another example, the candidate configurable values can be a set or a subset of {0.25, 0.5, 1, 2, 3, 4, 5} ms if the maximum DTTC window duration is 5 ms.

In one embodiment 2, a UE may be able to acquire timing information, including symbol boundary and index, slot boundary and index, as well as frame boundary and index, from the received DSCH, at least for initial access purpose in standalone operation. The index of possible DSCH location in a DTTC window can be indicated to the UE using a signal and/or channel in the DSCH, wherein the possible DSCH location can be associated to a possible SS/PBCH block location index within a DTTC window (e.g., equivalently as the index of possible SS/PBCH block location within a DTTC window).

In one example, one DTTC window may have X possible predefined locations for SS/PBCH block transmission, and every possible SS/PBCH block location requires indication, then, total number of timing hypotheses to indicate is N_t=X. X can be determined on the duration of DTTC window and the SCS of SS/PBCH block, e.g., X=D_DTTC*2*(SCS_SSB/15), wherein SCS_SSB is the SCS of SS/PBCH block in the unit of kHz. Examples of determining X are shown in TABLE 2.

In another example, one DTTC window may have X possible predefined locations for SS/PBCH block transmission, and there is QCL assumption among SS/PBCH blocks within the DTTC window. In this example, every group of QCLed SS/PBCH block locations requires indication, and total number of timing hypotheses to indicate is N_t=X/G, where G is size of group of QCLed SS/PBCH blocks, e.g., every pair of SS/PBCH blocks within a slot are QCLed and G=2. For instance, for SS/PBCH blocks within each group, their SS/PBCH block index can be the same. X can be determined on the duration of DTTC window and the SCS of SS/PBCH block, e.g., X=D_DTTC*2*(SCS_SSB/15), wherein SCS_SSB is the SCS of SS/PBCH block in the unit of kHz. Examples of determining X is shown in TABLE 2.

TABLE 2

Examples of determining the number of possible locations for SS/PBCH block transmission in DTTC window.

| D_DTTC | SCS of SS/PBCH block | X |
| --- | --- | --- |
| 4 ms | 15 kHz | 8 |
| 4 ms | 30 kHz | 16 |
| 4 ms | 60 kHz | 32 |
| 5 ms | 15 kHz | 10 |
| 5 ms | 30 kHz | 20 |
| 5 ms | 60 kHz | 40 |
| 10 ms | 15 kHz | 20 |
| 10 ms | 30 kHz | 40 |
| 10 ms | 60 kHz | 80 |
| 2.5 ms | 60 kHz | 20 |
| 2 ms | 60 kHz | 16 |
| 8 ms | 15 kHz | 16 |
| 6 ms | 15 kHz | 12 |
| 6 ms | 30 kHz | 24 |
| 6 ms | 60 kHz | 48 |
| 3 ms | 30 kHz | 12 |
| 3 ms | 15 kHz | 6 |
| 1.5 ms | 60 kHz | 12 |
| 2 ms | 15 kHz | 4 |
| 2 ms | 30 kHz | 8 |
| 1 ms | 15 kHz | 2 |
| 1 ms | 30 kHz | 4 |
| 0.5 ms | 15 kHz | 1 |
| 0.5 ms | 30 kHz | 2 |
| 0.25 ms | 30 kHz | 1 |

At least one of the following examples and/or their combinations can be supported for determining the timing and/or QCL assumption.

In one example, one of the N_t timing hypotheses representing the index of possible location of SS/PBCH block within a DTTC window (e.g., $0 \le i\_t \le N\_t-1$) is directly indicated to the UE by the DMRS sequence of PBCH in the corresponding SS/PBCH block, which means for a given cell, the number of DMRS sequences equals to N_t, and each of the sequence corresponds to a potential SS/PBCH block location in the DTTC window. When a UE detects the DMRS sequence of PBCH in a received SS/PBCH block, the UE can determine the timing (e.g., the timing location within the DTTC window) based on the index of the DMRS sequence.

In such example, if N_t can be different for standalone and non-standalone operations, and/or N_t can be different for different configured SCS of SS/PBCH block for non-standalone operation, the number of DMRS sequences can be different for the above scenarios. For a given cell, the corresponding DMRS sequences of PBCH for a smaller N_t is a subset of the DMRS sequences of PBCH for a larger N_t. If a cell can have N_t1 number of DMRS sequences for a first SCS of SS/PBCH block as SCS_SSB1, and can have N_t2 number of DMRS sequences for a second SCS of SS/PBCH block as SCS_SSB2, wherein N_t1>N_t2, then the set of N_t2 DMRS sequences for SCS_SSB2 is a subset of the set of N_t1 DMRS sequences for SCS_SSB1. In one example, the DMRS sequence corresponding to i_t in the set of N_t2 DMRS sequences for SCS_SSB2, wherein $0 \le i\_t \le N\_t2-1$, is the same as the DMRS sequence corresponding to i_t in the set of N_t1 DMRS sequences for SCS_SSB1, for a same given cell ID.

In another example, one of the N_t timing hypotheses representing the index of possible location of SS/PBCH block (e.g., $0 \le i\_t \le N\_t-1$) is indicated to the UE by the combination of DMRS sequence of PBCH in the corresponding SS/PBCH block of the associated DSCH and other signal/channel of the associated DSCH (e.g., PBCH content).

In such example, the 3 LSBs of the index of possible location of SS/PBCH block (e.g., $0 \le i\_t \le N\_t-1$) is carried by the DMRS of PBCH, and the remaining part is carried by the content of PBCH (e.g., PBCH payload but not in MIB). For instance, the field $\bar{a}_{\bar{A}+7}$ in PBCH payload but not in MIB is used to indicate the 4th LSB of the index of possible location of SS/PBCH block within the DTTC window if applicable (e.g., when N_t>8), and the field $\bar{a}_{\bar{A}+6}$ in PBCH payload but not in the MIB is used to indicate the 5th LSB of the index of possible location of SS/PBCH block within the DTTC window if applicable (e.g., when N_t>16).

For a given cell, the number of DMRS sequences of PBCH equals 8 in this example. When a UE detects the DMRS sequence of PBCH in a received SS/PBCH block and decodes the timing information carried by the content of PBCH, the UE can determine the timing (e.g., the index of SS/PBCH block location within the DTTC window) using 8*i_PBCH+i_SSB, wherein i_PBCH is the decoded timing information carried by the content of PBCH (e.g., $\bar{a}_{\bar{A}+6}$ and $\bar{a}_{\bar{A}+7}$ if applicable), and i_SSB is the detected index of DMRS sequence in the corresponding SS/PBCH block.

In yet another example, a part of the index of possible location of SS/PBCH block (e.g., 0≤i_t≤N_t−1) is carried by DMRS of PBCH, wherein the part is configurable as i_t mod K and K is indicated in PBCH content (e.g., MIB) with K≤L_max (L_max is the maximum number of transmitted SS/PBCH blocks within a DTTC window for a given band) and the remaining part (e.g., floor(i_t/K)) is carried by another field in PBCH content (e.g., PBCH content but not in MIB). When a UE detects the DMRS sequence of PBCH in a received SS/PBCH block, and decodes the timing information as well as K carried by the content of PBCH, the UE can determine the timing (e.g., the timing location within the DTTC window) using K*i_PBCH+i_SSB, wherein i_PBCH is the decoded timing information carried by the content of PBCH, and i_SSB is the detected index of DMRS sequence in the corresponding SS/PBCH block.

In such example, if N_t can be different for standalone and non-standalone operations, and/or N_t can be different for different configured SCS of SS/PBCH block for non-standalone operation, the number of DMRS sequences are the same for the above scenarios, and the indication of remaining timing information in other signal/channel can be different for the above scenarios (e.g., different bit-width in the content of PBCH). For example, if N_t is different for 15 kHz SCS and 30 kHz SCS of SS/PBCH block (e.g., N_t for 30 kHz SCS is twice of the N_t for 15 kHz), then the number of bits indicating the remaining timing information in other signal/channel (e.g., in PBCH payload but not MIB) is different (e.g., the number of bits for 30 kHz SCS is twice of the number of bits for 15 kHz SCS, and 1 bit can be reserved for 15 kHz SCS).

For example, if N_t=20 for 30 kHz SCS, 2 bits in PBCH payload but not in MIB, e.g., $\bar{a}_{\bar{A}+6}$ and $\bar{a}_{\bar{A}+7}$, are used for indicating the 5th and 4th LSB of the index of possible location of SS/PBCH block, correspondingly; and if N_t=10 for 15 kHz SCS, 1 bit in PBCH payload but not in MIB, e.g., $\bar{a}_{\bar{A}+7}$, are used for indicating the 4th LSB of the index of possible location of SS/PBCH block.

In yet another example, one of the N_t timing hypotheses is expressed in two parts: a SS/PBCH block index (e.g., denoted as i_SSB) and a timing offset common for all SS/PBCH blocks in the window (e.g., denoted as O_DSCH in term of the number of possible SS/PBCH block locations). An SS/PBCH block index can be carried by the DMRS of PBCH in the corresponding SS/PBCH block (which means the SS/PBCH block index is corresponding to the DMRS sequence index for a given cell). The common timing offset can be carried by the content of PBCH (e.g., in PBCH payload but not MIB). In this approach, the number of DMRS sequences of PBCH equals the number of SS/PBCH block indices. In this approach, the number of bits for representing O_DSCH is determined on the granularity of the offset.

For example, if the granularity of the offset is 1 possible SS/PBCH block location, the number of bits for presenting O_DSCH could be [log 2(N_t)]. For another example, if the granularity of the offset is 2 possible SS/PBCH block location (e.g., a slot), the number of bits for presenting O_DSCH could be [log 2(N_t/2)]. For yet another example, if the granularity of the offset is 4 possible SS/PBCH block locations (e.g., 2 slots, which is 1 ms in term of 30 kHz SCS), the number of bits for presenting O_DSCH could be [log 2(N_t/4)]. For yet another example, if the granularity of the offset is 8 possible SS/PBCH block locations (e.g., 4 slots, which is 2 ms in term of 30 kHz SCS), the number of bits for presenting O_DSCH could be [log 2(N_t/8)]. In this approach, after receiving a SS/PBCH block, a UE can determine the location of the received SS/PBCH block within the DTTC window as O_DSCH+i_SSB, wherein O_DSCH is carried by the PBCH content of the received SS/PBCH block, and i_SSB is carried by the DMRS sequence of the received SS/PBCH block.

In yet another example, if N_t can be different for standalone and non-standalone operations, and/or N_t can be different for different configured SCS of SS/PBCH block for non-standalone operation, the number of DMRS sequences are the same for the above scenarios, and the indication of the common timing offset can be different for the above scenarios (e.g., different bit-width in the content of PBCH). For example, if N_t is different for 15 kHz SCS and 30 kHz SCS of SS/PBCH block (e.g., N_t for 30 kHz SCS is twice of the N_t for 15 kHz), then the number of bits indicating the common timing offset (e.g., in PBCH payload but not MIB) is different (e.g., the number of bits for 30 kHz SCS is twice of the number of bits for 15 kHz SCS, and 1 bit can be reserved for 15 kHz SCS).

In yet another example, one of the N_t timing hypotheses is expressed in two parts: a SS/PBCH block index (e.g., denoted as i_SSB) and a timing offset common for all SS/PBCH blocks in the window (e.g., denoted as O_DSCH). Both SS/PBCH block index and the common timing offset can be carried by the DMRS of PBCH in the corresponding SS/PBCH block, e.g., the number of DMRS sequences equals to the product of the maximum number of SS/PBCH blocks transmitted in the DTTC window and the number of values on the common offset O_DSCH. A UE can determine the location of the received SS/PBCH block as O_DSCH+i_SSB.

In yet another example, if N_t can be different for standalone and non-standalone operations, and/or N_t can be different for different configured SCS of SS/PBCH block for non-standalone operation, the number of DMRS sequences are the same for the above scenarios, and the indication of the common timing offset can be different for the above scenarios (e.g., different bit-width).

In yet another example, one of the N_t timing hypotheses representing the index of possible location of SS/PBCH block (e.g., 0≤i_t≤N_t−1) is directly indicated to the UE by the combination of DMRS sequence of PBCH in the corresponding SS/PBCH block of the associated DSCH and the mapping order of the DMRS sequence (e.g., mapping order from lowest RE to highest RE and mapping order from highest RE to lowest RE can be used for indicating 1-bit information). For one example, the 3 LSBs of the index of possible location of SS/PBCH block (e.g., 0≤i_t≤N_t−1) is carried by DMRS of PBCH, and the remaining part is indicated by the mapping order of the sequence. The number of DMRS sequences of PBCH equals 8 in this example.

In yet another example, if N_t can be different for standalone and non-standalone operations, and/or N_t can be different for different configured SCS of SS/PBCH block for non-standalone operation, the number of DMRS sequences are the same for the above scenarios, and the indication of remaining timing information in other signal/channel can be different for the above scenarios (e.g., whether or not to utilize the mapping order to indicate information).

In yet another example, one of the N_t timing hypotheses representing the index of possible location of SS/PBCH block (e.g., 0≤i_t≤N_t−1) is indicated to the UE by the combination of DMRS sequence of PBCH in the corresponding SS/PBCH block of the associated DSCH and other signal/channel of the associated DSCH (e.g., PBCH content). For one example, the SS/PBCH block index is carried by DMRS of PBCH, and PBCH indicates the location of the corresponding SS/PBCH block in term of the group index with group size equal to the granularity of possible starting location. For example, if the granularity of possible starting location is denoted as G_SSB, in term of the number of possible SS/PBCH block locations, then the whole DTTC window can be grouped into N_t/G_SSB groups indexed from 0 to N_t/G_SSB−1, and the group index for the corresponding SS/PBCH block is indicated to the UE in PBCH content, such that the UE can determine the timing within the DTTC window as well as the location of the received SS/PBCH block within the transmitted burst (e.g., for rate matching purpose).

In yet another example, one of the above approaches of this embodiment can be combined with NR specification such that the above approach of this embodiment is utilized to indicate timing information for SS/PBCH blocks in the DTTC window, and NR specification (e.g., DMRS of PBCH and content of PBCH) is utilized to indicate the timing information for SS/PBCH blocks outside the DTTC, wherein the DMRS sequences for SS/PBCH blocks in the DTTC window do not coincide with the ones for SS/PBCH blocks outside the DTTC window, in a given cell, such that by detecting the DMRS sequence of the received SS/PBCH block, a UE is able to distinguish whether the received SS/PBCH block is in or outside a DTTC window. For this approach, the number of DMRS sequences for a given cell equals to the summation of 8 (e.g., the number in NR specification) and the number of DMRS sequences in the above approach.

In one embodiment, the index of DMRS sequence of PBCH in the corresponding SS/PBCH block for a given cell (e.g., denoted as i_SSB) can be determined by i_SSB=i_t mod L_max, wherein i_t is the index of potential location for SS/PBCH block within a DTTC window, and L_max is the maximum number of transmitted SS/PBCH blocks within a DTTC window for a given band (e.g., L_max=8 for a sub7 GHz unlicensed band). In this embodiment, the transmission of SS/PBCH blocks is effective as cyclically wrapping around the truncated SS/PBCH blocks with fixed module value as L_max due to LBT. The UE can further acquire the QCL assumption based on the determined index of DMRS sequence of PBCH in the corresponding SS/PBCH block (e.g., i_SSB).

In one example, a UE assumes the SS/PBCH blocks in different DTTC windows with same possible location index are QCLed.

In another example, a UE assumes the SS/PBCH blocks in same and/or different DTTC windows with same index after modeling K are QCLed, where K is a configurable number for a given band and the index can be represented by the index of the corresponding DMRS sequence of PBCH.

In one example, K can be in the form of L_max/k, wherein L_max is the maximum number of transmitted SS/PBCH blocks within a DTTC window for a given band (e.g., L_max=8 for a sub7 GHz unlicensed band), and k is a configurable integer, then, K represents the granularity of blind detection when soft combining SS/PBCH blocks, and the monitoring locations with respect to mod K is a superset of the monitoring locations for mod L_max.

In another example, K can be configured from the set or a subset of the set of any integer smaller or equal to L_max, wherein L_max is the maximum number of transmitted SS/PBCH blocks within a DTTC window for a given band (e.g., L_max=8 for a sub7 GHz unlicensed band). In one approach, the configuration of K is indicated by the payload of PBCH (e.g., the MIB of PBCH). In another approach, the configuration of K is indicated by RMSI. In yet another approach, the configuration of K can be obtained from bitmap in RMSI indicating the actually transmitted SS/PBCH block(s) and no explicit configuration is required in PBCH.

For one example of this example, K can be configurable using 1 bit in the payload of PBCH (e.g., the MIB of PBCH) or RMSI from {4, 8} for a sub7 GHz unlicensed band. For another example of this embodiment, K can be configurable using 2 bits in the payload of PBCH (e.g., the MIB of PBCH) or RMSI from {2, 4, 8} for a sub7 GHz unlicensed band.

For yet another example of this embodiment, K can be configurable using 2 bits in the payload of PBCH (e.g., the MIB of PBCH) or RMSI from {1, 2, 4, 8} for a sub7 GHz unlicensed band. For yet another example of this embodiment, K can be configurable using 3 bits in the payload of PBCH (e.g., the MIB of PBCH) or RMSI from {1, 2, 3, 4, 5, 6, 7, 8} for a sub7 GHz unlicensed band.

In one consideration, K does not necessarily equal to the number of actually transmitted SS/PBCH blocks within a DTTC window for a given band, but can be larger or equal to number of actually transmitted SS/PBCH blocks within a DTTC window for a given band, hence, a UE does not expect the number of actually transmitted SS/PBCH blocks within a DTTC window for a given band (e.g., by using the bitmap in RMSI and/or RRC indicating the actually transmitted SS/PBCH block(s)) to be larger than K, and/or a UE does not expect the bit in the bitmap in RMSI and/or RRC indicating the actually transmitted SS/PBCH block(s) (e.g. ssb-PositionsInBurst) taking a value of 1, wherein the bit corresponds to the SS/PBCH block with index larger than K.

In another consideration, a UE expects a bit in the bitmap in RMSI and/or RRC indicating the actually transmitted SS/PBCH block(s) may take a value of 1 only when the bit is within the first K bits. In this embodiment, the transmission of SS/PBCH blocks is effective as cyclically wrapping around the truncated SS/PBCH blocks based on module of K due to LBT.

In yet another consideration, when K is not configured to the UE (e.g., by PBCH content or RMSI for serving cell, and/or by RRC parameter for neighboring cell), the UE assumes a default value of K. For example, in the initial access procedure, wherein the UE may not have the information of K, the UE can assume a default value of K. For another example, in the RRM measurement procedure (e.g., either serving cell or neighboring cell), wherein the UE is not configured a value K, the UE can assume a default value of K.

In one example of the default value of K can be 8. In another example of the default value of K can be 1. In yet another example of the default value of K can be 4. In yet another example of the default value of K can be 2. In one approach for the indication of K, when K is indicated in PBCH payload, K can be indicated using a new field in MIB. In another approach for the indication of K, when K is indicated in PBCH payload, K can be indicated using 2 MSBs, or 2 LSBs, 2nd and 3rd LSBs of field controlResourceSetZero in pdcch-ConfigSIB1 in MIB.

In yet another approach for the indication of K, when K is indicated in PBCH payload, K can be indicated using 2 MSBs, or 2 LSBs, or 2nd and 3rd LSBs of field searchSpaceZero in pdcch-ConfigSIB1 in MIB.

In yet another approach for the indication of K, when K is indicated in PBCH payload, K can be indicated using the combination of at least 1 MSB or LSB of field searchSpaceZero in pdcch-ConfigSIB1, 1 bit of field subCarrierSpacingCommon, or 1 MSB or LSB of field controlResourceSetZero in pdcch-ConfigSIB1 in MIB.

In yet another approach for the indication of K, when K is indicated in PBCH payload, K can be indicated using the combination of 1 MSB or LSB of field controlResourceSetZero in pdcch-ConfigSIB1, 1 bit of field subCarrierSpacingCommon, or 1 MSB or 1 LSB of field ssb-SubcarrierOffset, in MIB.

In yet another approach for the indication of K, when K is indicated in PBCH payload, K can be indicated using 2 MSB or 2 LSBs of field ssb-SubcarrierOffset.

In yet another approach for the indication of K, when K is indicated in PBCH payload, K can be indicated using the combination of 1 MSB or LSB of field controlResourceSetZero in pdcch-ConfigSIB1 and 1 bit of field searchSpaceZero in pdcch-ConfigSIB1 in MIB.

In another embodiment, the index of DMRS sequence of the corresponding SS/PBCH block for a given cell (e.g., denoted as i_SSB) can be determined by i_SSB=i_t mod (L_max/G), wherein i_t is the index of potential location for transmitting grouped QCLed SS/PBCH blocks with group size as G, and L_max is the maximum number of transmitted SS/PBCH blocks within a DTTC window for a given band (e.g., L_max=8 for a sub7 GHz unlicensed band).

In such embodiment, the transmission of SS/PBCH blocks is effective as cyclically wrapping around the truncated SS/PBCH blocks with fixed module value as L_max/G due to LBT.

In one example, a UE assumes the SS/PBCH blocks in different DTTC windows with same index are QCLed, where the index can be represented by the index of the corresponding DMRS sequence of PBCH. In another example, a UE assumes the SS/PBCH blocks in different DTTC windows with same index after modeling K are QCLed, where K is indicated in PBCH content, and the index can be represented by the index of the corresponding DMRS sequence of PBCH.

In yet another embodiment, the index of DMRS sequence of the corresponding SS/PBCH block for a given cell (e.g., denoted as i_SSB) can be determined by i_SSB=i_t mod K, wherein i_t is the index of potential location for transmitting SS/PBCH blocks, and K is a configurable number for a given band. For one approach of this embodiment, K can be in the form of L_max/k, wherein L_max is the maximum number of transmitted SS/PBCH blocks within a DTTC window for a given band (e.g., L_max=8 for a sub7 GHz unlicensed band), and k is a configurable integer, then, K represents the granularity of blind detection when soft combining SS/PBCH blocks, and the monitoring locations with respect to mod K is a superset of the monitoring locations for mod L_max.

For another approach of this embodiment, K can be configured from the set or a subset of the set of any integer smaller or equal to L_max, wherein L_max is the maximum number of transmitted SS/PBCH blocks within a DTTC window for a given band (e.g., L_max=8 for a sub7 GHz unlicensed band).

In one approach, the configuration of K is indicated by the payload of PBCH (e.g., the MIB of PBCH). In another approach, the configuration of K is indicated by RMSI. In yet another approach, the configuration of K can be obtained from bitmap in RMSI indicating the actually transmitted SS/PBCH block(s) and no explicit configuration is required in PBCH. For one example of this embodiment, K can be configurable using 1 bit in the payload of PBCH (e.g., the MB of PBCH) or RMSI from {4, 8} for a sub7 GHz unlicensed band. For another example of this embodiment, K can be configurable using 2 bits in the payload of PBCH (e.g., the MIB of PBCH) or RMSI from {2, 4, 8} for a sub7 GHz unlicensed band. For yet another example of this embodiment, K can be configurable using 2 bits in the payload of PBCH (e.g., the MIB of PBCH) or RMSI from {1, 2, 4, 8} for a sub7 GHz unlicensed band.

For yet another example, K can be configurable using 3 bits in the payload of PBCH (e.g., the MIB of PBCH) or RMSI from {1, 2, 3, 4, 5, 6, 7, 8} for a sub7 GHz unlicensed band. In one consideration, K does not necessarily equal to the number of actually transmitted SS/PBCH blocks within a DTTC window for a given band, but can be larger or equal to number of actually transmitted SS/PBCH blocks within a DTTC window for a given band, hence, a UE does not expect the number of actually transmitted SS/PBCH blocks within a DTTC window for a given band (e.g., by using the bitmap in RMSI and/or RRC indicating the actually transmitted SS/PBCH block(s)) to be larger than K, and/or a UE does not expect the bit in the bitmap in RMSI and/or RRC indicating the actually transmitted SS/PBCH block(s) taking a value of 1, wherein the bit corresponds to the SS/PBCH block with index larger than K.

In another consideration, a UE expects a bit in the bitmap in RMSI and/or RRC indicating the actually transmitted SS/PBCH block(s) may take a value of 1 only when the bit is within the first K bits. In such embodiment, the transmission of SS/PBCH blocks is effective as cyclically wrapping around the truncated SS/PBCH blocks based on module of K due to LBT.

In one example, a UE assumes the SS/PBCH blocks in different DTTC windows with same index are QCLed, where the index can be represented by the index of the corresponding DMRS sequence of PBCH. In another example, a UE assumes the SS/PBCH blocks in different DTTC windows with same index after modeling K are QCLed, where K is indicated in PBCH content or RMSI, and the index can be represented by the index of the corresponding DMRS sequence of PBCH. In yet another consideration, when K is not configured to the UE (e.g., by PBCH content or RMSI for serving cell, and/or by RRC parameter for neighboring cell), the UE assumes a default value of K.

For example, in the initial access procedure, wherein the UE may not have the information of K, the UE can assume a default value of K. For another example, in the RRM measurement procedure (e.g., either serving cell or neighboring cell), wherein the UE is not configured a value K, the UE can assume a default value of K. In one example of the default value of K can be 8. In another example of the default value of K can be 1.

In yet another embodiment, the index of DMRS sequence of the corresponding SS/PBCH block for a given cell (e.g., denoted as i_SSB) can be determined by i_SSB=i_t−O_DSCH, wherein i_t is the index of potential location for SS/PBCH block, and O_DSCH is the common time-domain offset for the whole DSCH due to LBT. In such embodiment, the transmission of SS/PBCH blocks is effective as shifted by a group offset of O_DSCH due to LBT.

In one example, a UE assumes the SS/PBCH blocks in different DTTC windows with same index are QCLed, where the index can be represented by the index of the corresponding DMRS sequence of PBCH.

In one embodiment, a bitmap in RMSI and/or RRC indicates the actually transmitted SS/PBCH block(s), e.g., the i-th bit in the bitmap taking value of 1 means an SS/PBCH block is actually transmitted in one of the possible SS/PBCH block locations in the DTTC window, wherein the index of the possible SS/PBCH block locations after modulo operation with respect to K equals to i−1, and K is the configured value for QCL determination. In this embodiment, the bitmap can be considered as the SS/PBCH blocks intended to transmit, and the actual location for transmission is subject to LBT result.

In another embodiment, a bitmap in RMSI and/or RRC indicates the actually transmitted SS/PBCH block groups with group size G, by indicating the associated SS/PBCH block index, e.g., the i-th group of G bits in the bitmap taking value of 1 means the group of G QCLed SS/PBCH blocks with SS/PBCH block index i−1 are all transmitted.

In yet another embodiment, a gNB may guarantee the transmission of DSCH within a DTTC window is contiguous in time domain subject to regulation (e.g., no gap larger than 16 us in time domain). If the configuration of the bitmap for the indication of actually transmitted SS/PBCH block(s) has non-contiguous bits taking value of "1," which means gap(s) exists between transmissions of SS/PBCH blocks, there may be other signal/channel, e.g., PDCCH and/or PDSCH of RMSI, OSI, or paging, to fill in the gap(s). Examples are shown in FIG. 12.

Figure 12:
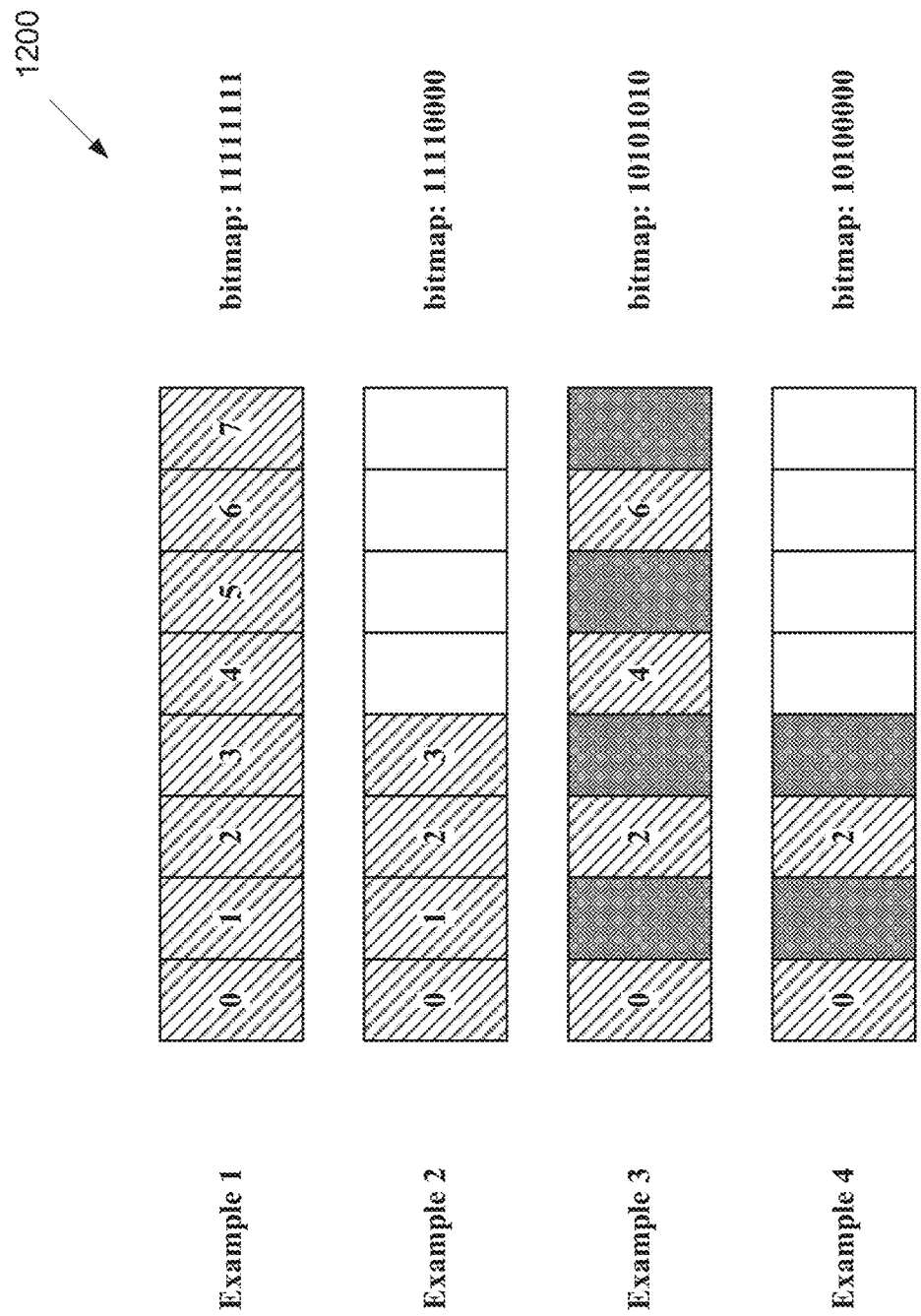
FIG. 12 illustrates an example configuration of bitmap with filled gap in time domain according to embodiments of the present disclosure.

FIG. 12 illustrates an example configuration of bitmap 1200 with filled gap in time domain according to embodiments of the present disclosure. An embodiment of the configuration of bitmap 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

In example 1 and example 2 of FIG. 12, the configuration of bitmap does not lead to any gap in time-domain. In example 3 and example 4 of FIG. 12, the configuration of bitmap leads to gap(s) in time domain and requires other signal/channel to fill in the gap(s) in order to be transmitted.

In yet another embodiment, if the DTTC window duration D_DTTC is larger than 5 ms (e.g., 6 ms), and/or the DTTC window is configured to be across a half frame boundary, the half frame indicator in PBCH payload does not change for all SS/PBCH blocks in the DTTC window (e.g., always the same as the half frame indicator corresponding to the first possible location for the transmission of SS/PBCH block within the DTTC window).

In yet another embodiment, if the transmission of SS/PBCH blocks is cyclically wrapping around based on modeling value K (e.g., K can be fixed as L_max or L_max/G, or indicated in PBCH content as in embodiments of the present disclosure), there is an indication of the location of the corresponding SS/PBCH block within the wrapping around modeling value K (e.g., indicating the location of 1 to K within K). In one example, the indication in is PBCH content. In another example, the indication is in RMSI.

In yet another embodiment, if the transmission of SS/PBCH blocks is cyclically wrapping around based on modeling value K (e.g., K can be fixed as L_max or L_max/G, or indicated in PBCH content as in embodiments of the present disclosure), there is an indication of the location of the first SS/PBCH block within the burst of SS/PBCH blocks. In one example, the indication is in PBCH content. In another example, the indication is in RMSI. In one example, the indication is in the term of the SS/PBCH block index of the first SS/PBCH block. In another example, the indication is floor (the SS/PBCH block index of the first SS/PBCH block/K). In yet another example, the indication is floor (the SS/PBCH block index of the first SS/PBCH block/L_max). In yet another example, the indication is floor (the SS/PBCH block index of the first SS/PBCH block/K). In yet another example, the indication is floor (the SS/PBCH block index of the first SS/PBCH block/(L_max/G)).

In yet another embodiment, a UE assumes the content of RMSI is the same for a frequency layer, and the configuration of the actually transmitted SS/PBCH block(s) in RMSI maintains the same regardless of the LBT results.

In one example, a UE can reinterpret the content of the bitmap in RMSI and/or RRC for the actually transmitted SS/PBCH block(s) based on the indication of timing and/or wrapping around or shifted offset information due to LBT. In this example, the bitmap in RMSI and/or RRC can be understood as the intended actually transmitted SS/PBCH blocks, and the corresponding actually transmitted SS/PBCH block (e.g., represented by the index of DMRS sequence of SS/PBCH block) can be determined based on the indication of timing and/or wrapping around or shifted offset information due to LBT.

For example, if a common timing offset, e.g., O_DSCH expressed in term of number of SS/PBCH block locations, is indicated to the UE, the UE can determine that i-th bit in the bitmap taking value of 1 means the SS/PBCH block with index (O_DSCH+i−1) mod L_max is actually transmitted, in the transmission scheme wherein the whole DSCH is shifted due to LBT.

In another example, if the transmission of SS/PBCH blocks is cyclically wrapping around based on module of K due to LBT, wherein K is indicated, then a SS/PBCH block with detected index i_SSB corresponding to i-th bit in the bitmap indicating actually transmitted SS/PBCH blocks, wherein i=i_SSB+1−K if i_SSB≥K, and i=i_SSB+1 if i_SSB<K.

In yet another embodiment, configuration of the actually transmitted SS/PBCH block(s) in RMSI can be different subject to the LBT result, such that the same bitmap applies to all the actually transmitted SS/PBCH blocks on the same frequency layer within the same DTTC window, and the bitmap can be different across different DTTC windows on the same frequency layer.

In yet another embodiment, if the transmission of SS/PBCH blocks is cyclically wrapped around, the allowed starting location for the transmission of DSCH including SS/PBCH blocks may depend on at least the configuration of bitmap indicating the actually transmitted SS/PBCH block(s) in RMSI.

Figure 13:
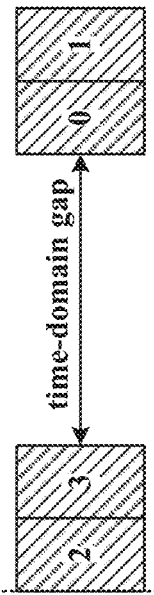
FIG. 13 illustrates an example allowed starting of transmission of DSCH based on bitmap of indicating actually transmitted SS/PBCH blocks according to embodiments of the present disclosure.
Figure 13:
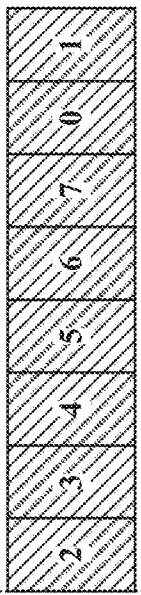
Figure 13:
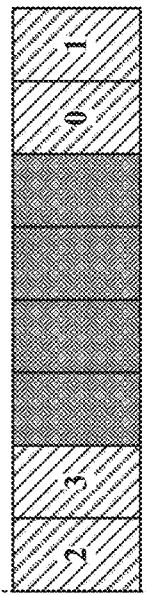
Figure 13:

FIG. 13 illustrates an example allowed starting of transmission of DSCH 1300 based on bitmap of indicating actually transmitted SS/PBCH blocks according to embodiments of the present disclosure. An embodiment of the allowed starting of transmission of DSCH 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

In one example (e.g., example 1 in FIG. 13), when the bitmap indicating the actually transmitted SS/PBCH block(s) in RMSI takes value of "1" for every bit, every possible predefined starting location for DSCH transmission can be used based on the LBT result.

In another example (e.g., example 2 in FIG. 13), when the bitmap indicating the actually transmitted SS/PBCH block(s) in RMSI does not take value of "1" for every bit, there could be a gap in time domain after some SS/PBCH blocks are cyclically wrapped around due to LBT. If there is no other signal(s)/channel(s) transmitted to fill in the gap, the transmission of DSCH may not be allowed.

In yet another example (e.g., example 3 in FIG. 13), when the bitmap indicating the actually transmitted SS/PBCH block(s) in RMSI does not take value of "1" for every bit, there could be a gap in time domain after some SS/PBCH blocks are cyclically wrapped around due to LBT. If there is other signal(s)/channel(s) transmitted to fill in the gap, the transmission of DSCH can be allowed. In one scenario, the QCLed PDCCH/PDSCH of RMSI, OSI, or paging is not expected to be multiplexed in the slots prior to the transmission of SS/PBCH block in the same DTTC window, then the multiplexed signal(s)/channel(s) in the gap cannot be the QCLed PDCCH/PDSCH of RMSI, OSI, or paging for SS/PBCH blocks to be transmitted in later slots.

In yet another embodiment, the indication of the actually transmitted SS/PBCH block(s) in the format of a bitmap is in the content of PBCH. In one sub-embodiment, the indication maintains the same for all SS/PBCH blocks on the same frequency layer. In another sub-embodiment, the indication can be different subject to the LBT result, such that the same indication of bitmap applies to all the actually transmitted SS/PBCH blocks on the same frequency layer within the same DTTC window, and the indication of bitmap can be different across different DTTC windows on the same frequency layer.

In yet another embodiment, a UE does not expect to receive PDCCH or PDSCH of at least one of RMSI, OSI, or paging, which is QCLed with the received SS/PBCH block, from previous slot(s) comparing to the slot containing received SS/PBCH block within the DTTC window.

In NR specification, for a given cell, the number of DMRS sequences of PBCH is 8, which corresponds to an SS/PBCH block index in a half frame or part of it (e.g., 3 LSB of the SS/PBCH block index for FR2).

In one embodiment, the number of DMRS sequences of PBCH can be larger than 8, for a given cell, at least for some scenarios. For example, the number of DMRS sequence for a given cell (e.g., denoted as N_DMRS) could equal to N_t (e.g., the number of possible SS/PBCH block locations in a DTTC window, or the number of possible locations to carry a pair of QCLed SS/PBCH blocks in a DTTC window) in the other embodiments of the present disclosure, or could equal to the product of the maximum number of SS/PBCH blocks transmitted in the DTTC window and the number of values on the common offset O_DSCH in the other embodiments of the present disclosure.

In such embodiment, the DMRS sequence of PBCH can be constructed by a QPSK modulated Gold-sequence. The Gold sequence is XOR of two M-sequences, where one of the M-sequence $s_A(n)$ is generated with generator $g_A(x) = x^{31}+x^3+1$ and initial condition cA=1, and the other M-sequence $s_B(n)$ is generated with generator $g_B(x)=x^{31}+x^3+x^2+x+1$ and initial condition $c_B = c0*(i\_t+1)*([N\_ID\hat{}cell/4]+1)+c1*(i\_t+1)+mod(N\_ID\hat{}cell,4)$, where in N_ID^cell is the cell ID, i_t is the timing information carried by the DMRS sequence with 0≤i_t≤N_DMRS−1, and c0 and c1 are predefined integers. There is a possible output shift offset Nc=1600 such that the QPSK modulated Gold-sequence $s(n)=(1-2*((s_A(2*n+Nc)+s_B(2*n+Nc)) \bmod 2))/\sqrt{2}+j*(1-2*((s_A(2*n+Nc+1)+s_B(2*n+Nc+1)) \bmod 2))/\sqrt{2}$. s(n) is truncated to the desired DMRS sequence length and mapped to the corresponding REs for DMRS.

In one example, N_DMRS=10. For this value of N_DMRS, parameters c0 and c1 can be selected such that the real part of (maximum and/or mean) normalized cross-correlation is minimized (for both inter-cell and intra-cell scenario). In one example, c0=2^11 and c1=2^6. In another example, c0=1 and c1=2^15.

In another example, N_DMRS=16. For this value of N_DMRS, parameters c0 and c1 can be selected such that the real part of (maximum and/or mean) normalized cross-correlation is minimized (for both inter-cell and intra-cell scenario). In one example, c0=2^11 and c1=2^6. In another example, c0=1 and c1=2^14. In yet another example, c0=2^16 and c1=2^3.

In yet another example, N_DMRS=20. For this value of N_DMRS, parameters c0 and c1 can be selected such that the real part of (maximum and/or mean) normalized cross-correlation is minimized (for both inter-cell and intra-cell scenario). In one example, c0=2^11 and c1=2^6. In another example, c0=2^16 and c1=2^3. In yet another example, c0=2^12 and c1=2^4. In yet another example, c0=2^16 and c1=2^3.

In yet another example, N_DMRS=12. For this value of N_DMRS, parameters c0 and c1 can be selected such that the real part of (maximum and/or mean) normalized cross-correlation is minimized (for both inter-cell and intra-cell scenario). In one example, c0=2^11 and c1=2^6. In another example, c0=1 and c i=2^15.

DSCH can have multiple possible location within a DTTC window for transmission based on LBT result. The granularity of the starting location for DSCH transmission is denoted as G_SSB, which is defined in term of the number of possible SS/PBCH block locations. For example, if G_SSB=1, every possible SS/PBCH block location within the DTTC window could be used for the starting location of DSCH transmission, regardless the transmission is shifted or wrapped around due to LBT. For another example, if G_SSB=2, every 2 possible SS/PBCH block locations (e.g., a slot) within the DTTC window could be used for the starting location of DSCH transmission, regardless the transmission is shifted or wrapped around due to LBT.

For yet another example, if G_SSB=4, every 4 possible SS/PBCH block locations (e.g., 1 ms in 30 kHz SCS) within the DTTC window could be used for the starting location of DSCH transmission, regardless the transmission is shifted or wrapped around due to LBT. For yet another example, if G_SSB=8, every 8 possible SS/PBCH block locations (e.g., 2 ms in 30 kHz SCS) within the DTTC window could be used for the starting location of DSCH transmission, regardless the transmission is shifted or wrapped around due to LBT.

In one embodiment, the granularity of the starting location G_SSB is dependent on the LBT type. For example, if Cat2 LBT is utilized (assuming the condition for applying Cat2 LBT is satisfied), the granularity of the starting location is G_SSB-Cat2, and if Cat4 LBT is utilized, the granularity of the starting location is G_SSB-Cat4, where in G_SSB-Cat2 is not the same as G_SSB-Cat4 (e.g., G_SSB-Cat2>G_SSB-Cat4). For a particular instance, G_SSB-Cat2=4, and G_SSB-Cat4=1.

In another embodiment, the granularity of the starting location G_SSB is the same regardless of the LBT type. For example, the granularity of the starting location is 4, regardless of Cat2 or Cat4 LBT is utilized. For another example, the granularity of the starting location is 1, regardless of Cat2 or Cat4 LBT is utilized.

In one embodiment, COT acquired by the gNB has remaining duration after scheduled transmission of DSCH, the gNB can repeat the transmission of the whole DSCH burst within the COT and indicate the number of repetitions in PBCH. For one example, the indication is in PBCH content but not in MIB. For one example, there is an upper bound on the number of repetition (e.g., subject to the bit-width of the indication in PBCH).

In another embodiment, the transmission of SS/PBCH blocks within a DTTC window can be repeated, and there is an indication of the number of repetitions in PBCH. For example, PBCH indicates a number of repetitions, e.g., G, then a UE assumes every G SS/PBCH blocks are repeatedly transmitted and QCLed.

One or more of the following approaches can be supported for timing and QCL assumption indication for NR-U.

In one embodiment, the $4^{th}$ LSB of SFN is in MIB for NR-U, such that there can be one more bit for indicating LBT related timing information and/or QCL assumption information, wherein this one more bit is not contained in MIB but in PBCH payload.

In another embodiment, the bit-width for MIB is determined as 16 for NR-U, such that there can be more bits (e.g., 8 bits more) for indicating LBT related timing information and/or QCL assumption information.

In yet another embodiment, the L_max can be equal to 4 and the half radio frame indicator is carried by DMRS sequence of PBCH, such that there is no indication of half frame in PBCH content, and the saved bit can be for indicating LBT related timing information and/or QCL assumption information, wherein this one more bit is not contained in MIB but in PBCH payload.

Figure 14:
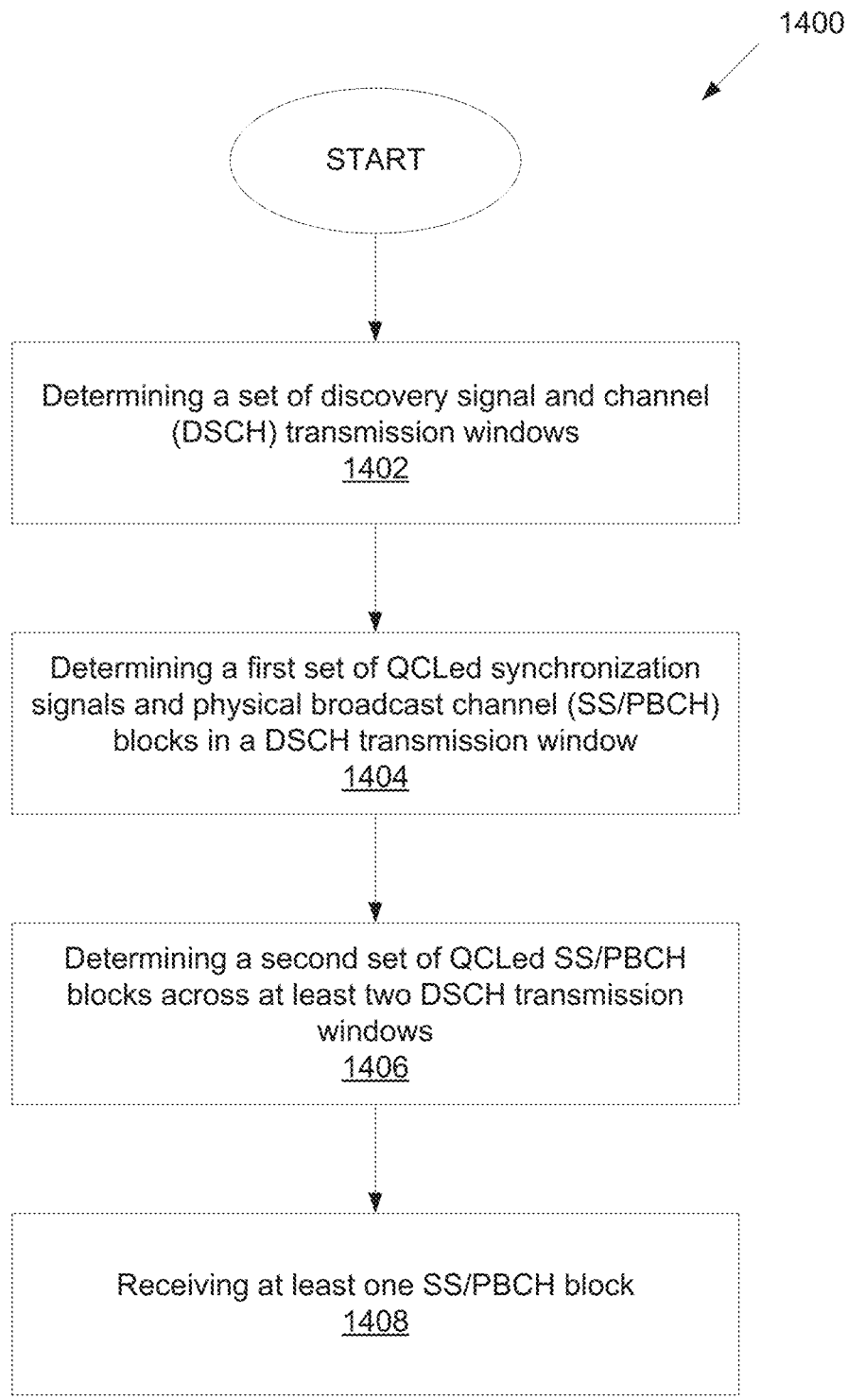
FIG. 14 illustrates an example of a method for timing configuration of discovery signal and channel according to embodiments of the present disclosure.

FIG. 14 illustrates an example of a method 1400 for timing configuration of discovery signal and channel according to embodiments of the present disclosure, as may be performed by a UE (e.g., 111-116 as illustrated in FIG. 1). An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 14, the method 1400 begins at step 1402. In step 1402, the UE determines a set of discovery signal and channel (DSCH) transmission windows based on a window periodicity, a window duration, and a window offset.

In step 1402, the window offset for the DSCH transmission window of the set of DSCH transmission windows is fixed, and the DSCH transmission window of the set of DSCH transmission windows starts from a boundary of half frame.

Subsequently, the UE, in step 1404, determines a first set of QCLed synchronization signals and physical broadcast channel (SS/PBCH) blocks within a DSCH transmission window of the set of DSCH transmission windows, wherein the first set of SS/PBCH blocks is quasi-co-located (QCLed).

Next, the UE, in step 1404, determines a second set of QCLed SS/PBCH blocks across at least two DSCH transmission windows, the at least two DSCH transmission windows being different DSCH windows of the set of DSCH transmission windows. In this step 1404, the second set of SS/PBCH blocks is QCLed.

In one embodiment, the first set of SS/PBCH blocks is determined to be QCLed, if first SS/PBCH blocks in the first set of SS/PBCH blocks include a same value of (I mod K); and the second set of SS/PBCH blocks are determined to be QCLed, if second SS/PBCH blocks in the second set of SS/PBCH blocks include a same value of (I mod K), where I is an index of DMRS sequence associated with PBCH of the first SS/PBCH blocks or the second SS/PBCH blocks, and K is determined as one from {1, 2, 4, 8} based on a combination of a first field of subCarrierSpacingCommon and a least significant bit (LSB) of a second field ssb-SubcarrierOffset, wherein the first field and second field being included in a master information block (MIB) of the first and second set of SS/PBCH blocks.

Finally in step 1408, the UE receives, from a base station (BS) over a downlink channel supporting the shared spectrum channel access, at least one SS/PBCH block that is located in the first set of SS/PBCH blocks or the second set of SS/PBCH blocks based on QCL information of the first set of SS/PBCH blocks or the second set of SS/PBCH blocks within the DSCH transmission window of the determined set of DSCH transmission windows.

In one embodiment, the UE determines the window periodicity for the DSCH transmission window of the set of the DSCH transmission windows as a periodicity of the at least one SS/PBCH block in the DSCH transmission window. In such embodiment, the UE does not receive the at least one SS/PBCH block outside the determined set of DSCH transmission windows.

In one embodiment, the UE receives the at least one SS/PBCH block based on candidate SS/PBCH block locations within the DSCH transmission window of the set of DSCH transmission windows. In such embodiment, a number of the candidate SS/PBCH block locations within the DSCH transmission window of the set of DSCH transmission windows is determined based on a sub-carrier spacing (SCS) of the at least one SS/PBCH block, and a maximum number of the candidate SS/PBCH block locations within the DSCH transmission window of the set of DSCH transmission windows is determined a 20 for the SCS of the at least one SS/PBCH block as 30 kHz, and a 10 for the SCS of the at least one SS/PBCH block as 15 kHz.

In one embodiment, the UE determines a timing instance of the received at least one SS/PBCH block based on an index of candidate SS/PBCH block location within the DSCH transmission window of the set of DSCH transmission windows.

In such embodiment, three least significant bits (LSBs) of the index of the candidate SS/PBCH block location is determined based on a demodulation reference signal (DMRS) associated with PBCH of the received at least one SS/PBCH block; fourth LSB of the index of the candidate SS/PBCH block location is determined based on a bit $\bar{a}_{\bar{A}+7}$ in a payload of PBCH of the received at least one SS/PBCH block, if a maximum number of candidate SS/PBCH block locations within the DSCH transmission window of the set of DSCH transmission windows is 10 or 20; and fifth LSB of the index of the candidate SS/PBCH block location is determined based on a bit $\bar{a}_{\bar{A}+6}$ in the payload of PBCH of the received at least one SS/PBCH block, if a maximum number of candidate SS/PBCH block locations within the DSCH transmission window of the set of DSCH transmission windows is 20.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method performed by a terminal in a communication system, the method comprising:
receiving, from a base station, a configuration for a discovery burst transmission window; and
receiving, from the base station via a shared spectrum, at least one synchronization signal/physical broadcast channel (SS/PBCH) block in at least one discovery burst transmission window configured with a periodicity,
wherein SS/PBCH blocks corresponding to a same SS/PBCH block index are quasi co-located (QCLed),
wherein the SS/PBCH block index is determined based on I and K, where I is an index of a demodulation reference signal (DMRS) sequence transmitted in a PBCH of a corresponding SS/PBCH block and K is a maximum number of transmitted SS/PBCH blocks in one discovery burst transmission window, and
wherein the SS/PBCH block index is determined as I mod K.

2. The method of claim 1, wherein the discovery burst transmission window starts from a first symbol of a first slot in a half-frame.

3. The method of claim 1, wherein the periodicity of the discovery burst transmission window is determined based on a configured periodicity for the at least one SS/PBCH block.

4. The method of claim 1, wherein a SS/PBCH block index associated with the at least one SS/PBCH block received from the base station in at least one discovery burst transmission window is indicated using a bitmap.

5. A method performed by a base station in a communication system, the method comprising:
transmitting, to a terminal, a configuration for a discovery burst transmission window; and
transmitting, based on a channel access procedure performed by the base station, to the terminal via a shared spectrum, at least one synchronization signal/physical broadcast channel (SS/PBCH) block in at least one discovery burst transmission window configured with a periodicity,
wherein SS/PBCH blocks corresponding to a same SS/PBCH block index are quasi co-located (QCLed),
wherein the SS/PBCH block index is determined based on I and K, where I is an index of a demodulation reference signal (DMRS) sequence transmitted in a PBCH of a corresponding SS/PBCH block and K is a maximum number of transmitted SS/PBCH blocks in one discovery burst transmission window, and
wherein the SS/PBCH block index is determined as I mod K.

6. The method of claim 5, wherein the discovery burst transmission window starts from a first symbol of a first slot in a half-frame.

7. The method of claim 5, wherein the periodicity of the discovery burst transmission window is determined based on a configured periodicity for the at least one SS/PBCH block.

8. The method of claim 5, wherein a SS/PBCH block index associated with the at least one SS/PBCH block transmitted to the terminal in at least one discovery burst transmission window is indicated using a bitmap.

9. A terminal in a communication system, the terminal comprising:
a controller; and
a transceiver operably connected to the controller, the transceiver configured to:
receive, from a base station, a configuration for a discovery burst transmission window; and
receive, from the base station via a shared spectrum, at least one synchronization signal/physical broadcast channel (SS/PBCH) block in at least one discovery burst transmission window configured with a periodicity,
wherein SS/PBCH blocks corresponding to a same SS/PBCH block index are quasi co-located (QCLed),
wherein the SS/PBCH block index is determined based on I and K, where I is an index of a demodulation reference signal (DMRS) sequence transmitted in a PBCH of a corresponding SS/PBCH block and K is a maximum number of transmitted SS/PBCH blocks in one discovery burst transmission window, and
wherein the SS/PBCH block index is determined as I mod K.

10. The terminal of claim 9, wherein the discovery burst transmission window starts from a first symbol of a first slot in a half-frame.

11. The terminal of claim 9, wherein the periodicity of the discovery burst transmission window is determined based on a configured periodicity for the at least one SS/PBCH block.

12. The terminal of claim 9, wherein a SS/PBCH block index associated with the at least one SS/PBCH block received from the base station in at least one discovery burst transmission window is indicated using a bitmap.

13. A base station in a communication system, the base station comprising:
a controller; and
a transceiver operably connected to the controller, the transceiver configured to:
transmit, to a terminal, a configuration for a discovery burst transmission window; and
transmit, based on a channel access procedure performed by the base station, to the terminal via a shared spectrum, at least one synchronization signal/physical broadcast channel (SS/PBCH) block in at least one discovery burst transmission window configured with a periodicity;
wherein SS/PBCH blocks corresponding to a same SS/PBCH block index are quasi co-located (QCLed),
wherein the SS/PBCH block index is determined based on I and K, where I is an index of a demodulation reference signal (DMRS) sequence transmitted in a PBCH of a corresponding SS/PBCH block and K is a maximum number of transmitted SS/PBCH blocks in one discovery burst transmission window, and
wherein the SS/PBCH block index is determined as I mod K.

14. The base station of claim 13, wherein the discovery burst transmission window starts from a first symbol of a first slot in a half-frame.

15. The base station of claim 13, wherein the periodicity of the discovery burst transmission window is determined based on a configured periodicity for the at least one SS/PBCH block.

16. The base station of claim 13, wherein a SS/PBCH block index associated with the at least one SS/PBCH block transmitted to the terminal in at least one discovery burst transmission window is indicated using a bitmap.

\* \* \* \* \*